United States Patent
Long et al.

(10) Patent No.: US 10,263,520 B2
(45) Date of Patent: Apr. 16, 2019

(54) DC-DC POWER CONVERTERS WITH STEP-UP AND/OR STEP-DOWN MODE(S)

(71) Applicant: GE ENERGY POWER CONVERSION TECHNOLOGY LTD, Rugby (GB)

(72) Inventors: Teng Long, Rugby (GB); Allan David Crane, Blaenau Ffestiniog (GB); Martin Charles Southall, Hollywood (GB); Mounir Louati, Rugby (GB)

(73) Assignee: GE ENERGY POWER CONVERSATION TECHNOLOGY LTD, Rugby (GB)

( * ) Notice: Subject to any disclaimer, the term of this patent is extended or adjusted under 35 U.S.C. 154(b) by 67 days.

(21) Appl. No.: 15/610,120

(22) Filed: May 31, 2017

(65) Prior Publication Data

US 2017/0346398 A1 Nov. 30, 2017

(30) Foreign Application Priority Data

May 31, 2016 (EP) ..................................... 16172109

(51) Int. Cl.
*H02M 3/158* (2006.01)
*H02M 1/14* (2006.01)

(52) U.S. Cl.
CPC ............. *H02M 3/158* (2013.01); *H02M 1/14* (2013.01)

(58) Field of Classification Search
None
See application file for complete search history.

(56) References Cited

U.S. PATENT DOCUMENTS

| 9,641,079 | B2 * | 5/2017 | Schmalnauer | ...... H02M 3/1582 |
| 2006/0152085 | A1 * | 7/2006 | Flett | .......................... B60L 9/30 |
| | | | | 307/75 |

(Continued)

FOREIGN PATENT DOCUMENTS

| EP | 1562279 A2 | 8/2005 |
| EP | 1928078 A1 | 6/2008 |
| WO | 2015063869 A1 | 5/2015 |

OTHER PUBLICATIONS

European Search Report in correspondence with EP Application No. 16172109 dated Jan. 31, 2017.

*Primary Examiner* — Adolf Berhane
*Assistant Examiner* — Henry Lee, III
(74) *Attorney, Agent, or Firm* — GE Global Patent Operation; Scott R. Stanley

(57) ABSTRACT

A DC/DC power converter connected to a DC power source having first and second DC terminals. The DC/DC power converter operates in voltage step-up and step-down modes. The converter includes first and second DC buses connected to the first and second DC terminals and third and fourth DC buses defining a DC link. Energy storage devices are connected between the third and fourth buses. A first converter leg includes a first branch with switches and a second branch. Each switch includes a controllable semiconductor switch and an anti-parallel connected freewheeling diode. A controller switches the controllable semiconductor switches between a conducting and non-conducting state, in the step-up and step-down modes, switching to supply power from the DC power source to the DC link in the step-up mode and to supply power from the DC link to the DC power source in the step-down mode.

20 Claims, 28 Drawing Sheets

(56) References Cited

U.S. PATENT DOCUMENTS

| | | | | |
|---|---|---|---|---|
| 2009/0167285 A1* | 7/2009 | Huang | ................ | H02M 3/1582 |
| | | | | 323/363 |
| 2014/0028092 A1* | 1/2014 | Takeshima | .......... | B60L 11/1812 |
| | | | | 307/10.1 |
| 2014/0246912 A1* | 9/2014 | Johnson, Jr. | ........ | H02M 3/1584 |
| | | | | 307/72 |
| 2015/0131349 A1* | 5/2015 | El-Barbari | ............ | H02M 1/088 |
| | | | | 363/131 |
| 2016/0072387 A1* | 3/2016 | Schmalnauer | ........ | H02M 3/158 |
| | | | | 323/271 |
| 2016/0344286 A1* | 11/2016 | Barker | .................... | H02M 3/07 |
| 2017/0012452 A1* | 1/2017 | Kang | .................... | H02J 7/0068 |
| 2017/0187296 A1* | 6/2017 | Zheng | .............. | H02M 3/33546 |

* cited by examiner

State 0 ⟶ State 1 ⟶ ......

DC-DC POWER CONVERTERS WITH STEP-UP AND/OR STEP-DOWN MODE(S)

BACKGROUND OF THE INVENTION

The present invention relates to power converters, and in particular to DC/DC power converters that can convert a low voltage direct current (LVDC) input to a medium voltage DC (MVDC) output or vice versa.

SUMMARY OF THE INVENTION

In an embodiment, a DC/DC power converter configured to operate in a voltage step-up mode and a voltage step-down mode is provided. The DC/DC power converter is connectable to a DC power source/load having a first DC terminal and a second DC terminal and comprising: first and second DC buses respectively connectable to the first and second DC terminals of the DC power source/load.

In an embodiment, at least one of the first and second DC buses including a reactor; third and fourth DC buses defining a DC link; N energy storage devices (e.g., capacitors) connected together in series between the third and fourth DC buses, where N≥2; a first converter leg comprising: a first branch having N sections connected together in series between the third and fourth DC buses in parallel with the N energy storage devices, In an embodiment, the N sections including (i) a first section including a first switch are connected to the third DC bus and a second switch connected to the first switch by a first connecting node, (ii) a second section including a first switch connected to the fourth DC bus and a second switch are connected to the first switch by a second connecting node, and (iii) optionally one or more intermediate sections between the first and second sections, each intermediate section including at least one switch, wherein the first connecting node is connected to the first DC bus and the second connecting node is connected to the second DC bus; and (N−1) second branches, In an embodiment, each second branch is connected between the junction of an adjacent ith pair of the first branch sections and the junction of an adjacent ith pair of energy storage devices, where 1≤i≤(N−1), each second branch optionally including a first switch and a second switch; wherein each switch comprises at least one controllable semiconductor switch and an anti-parallel connected freewheeling diode, each switch having an 'on' state when the at least one controllable semiconductor switch is in a conducting state and an 'off' state when the at least one controllable semiconductor switch is in a non-conducting (or blocking) state.

In an embodiment, comprises a controller for selectively switching the controllable semiconductor switches between the conducting state and the non-conducting (or blocking) state; wherein in the voltage step-up mode the controller is configured to switch repeatedly the DC/DC power converter between the following states to supply power from the DC power source/load to the DC link: a voltage step-up reactor charging state to charge the reactor from the DC power source/load where the first switches in the first and second sections of the first branch and the optional first and second switches in each second branch are switched to the 'off' state and the remaining switches in the first branch (the remaining switches will include the second switches in the first and second sections of the first branch and the switches of the intermediate sections, if any) are switched to the 'on' state such that current circulates in a first direction around a current loop that includes the DC power source/load, the at least one reactor, and the remaining switches in the first branch; and one of a plurality of voltage step-up reactor discharging states to discharge the reactor to the DC link, where the switches in the first branch and the optional first and second switches in each second branch are switched to the 'on' or 'off' state as appropriate such that current circulates in a first direction around a current loop that includes the DC power source/load, the at least one reactor, and one or more of the energy storage devices.

In an embodiment, in the voltage step-down mode the controller is configured to switch repeatedly the DC/DC power converter between the following states to supply power from the DC link to the DC power source/load: one of a plurality of voltage step-down reactor charging states to charge the reactor from the DC link, where the switches in the first branch and the optional first and second switches in each second branch are switched to the 'on' or 'off' state as appropriate such that current circulates in a second direction around a current loop that includes the DC power source/load, the at least one reactor, and one or more of the energy storage devices; and a voltage step-down reactor discharging state to discharge the reactor to the DC power source/load where the first switches in the first and second sections of the first branch and the optional first and second switches in each second branch are switched to the 'off' state and the remaining switches in the first branch are switched to the 'off' state such that current circulates in a second direction around a current loop that includes the DC power source/load, the at least one reactor, and the remaining switches (or more particularly, the anti-parallel connected freewheeling diodes of the remaining switches) in the first branch.

As used herein, the first direction of current circulation is where current flows out of the DC power source/load (or the DC power source for voltage step-up operation only) and into the DC link and the second direction of current circulation is where current flows out of the DC link and into the DC power source/load (or DC load for voltage step-down operation only).

The DC link voltage will typically be a medium voltage (MV), e.g., between about 1.5 kVDC and about 100.0 kVDC or for drive applications, up to about 15.0 kVDC.

The DC power source/load will typically operate at a low voltage (LV), e.g., less than about 1500 VDC. The DC power source/load can be an energy storage device that is capable of being charged and discharged, e.g., a battery, ultra-capacitor or super-capacitor. In this case, the DC/DC power converter must be capable of supporting bidirectional power flow and of being selectively operated in both voltage step-up and step-down modes. When the DC power source/load is being discharged it is acting as a DC power source and the DC/DC power converter will be operated in a voltage step-up mode to convert the LV input from the DC power source/load to a MV output at the DC link. When the DC power source/load is being charged it is acting as a DC load and the DC/DC power converter will be operated in a voltage step-down mode to convert the MV input from the DC link to an LV output for the DC power source/load.

The structure of the DC/DC power converter can be simplified if there is no need to support bidirectional power flow. In practice, this means that some of the switches in the first branch of the DC/DC power converter can be replaced with diodes that are typically less expensive and which avoid the need for drive circuits, or alternatively the switches can be maintained permanently in the 'off' state and allow the associated freewheeling diode to conduct.

In an arrangement, a DC/DC power converter is configured to operate in a voltage step-up mode, the DC/DC power converter being connectable to a DC power source having first and second DC terminals and comprising: first and second DC buses respectively connectable to the first and second DC terminals of the DC power source, at least one of the first and second DC buses including a reactor; third and fourth DC buses defining a DC link; N energy storage devices (e.g., capacitors) connected together in series between the third and fourth DC buses, where N≥2;

An embodiment provides a first converter leg comprising: a first branch having N sections connected together in series between the third and fourth DC buses in parallel with the N energy storage devices, the N sections including (i) a first section including one of a first switch and a diode connected to the third DC bus and a second switch connected to the one of the first switch and the diode by a first connecting node, (ii) a second section including one of a first switch and a diode connected to the fourth DC bus and a second switch connected to the one of the first switch and the diode by a second connecting node, and (iii) optionally one or more intermediate sections between the first and second sections, each intermediate section including at least one switch, wherein the first connecting node is connected to the first DC bus and the second connecting node is connected to the second DC bus; and(N−1) second branches, each second branch being connected between the junction of an adjacent ith pair of the first branch sections and the junction of an adjacent ith pair of energy storage devices, where 1≤i≤(N−1), each second branch optionally including a first switch and a second switch;

In an embodiment, each switch comprises at least one controllable semiconductor switch and an anti-parallel connected freewheeling diode, each switch having an 'on' state when the at least one controllable semiconductor switch is in a conducting state and an 'off' state when the at least one controllable semiconductor switch is in a non-conducting (or blocking) state; and a controller for selectively switching the controllable semiconductor switches between the conducting state and the non-conducting (or blocking) state;

In an embodiment, the controller is configured to switch repeatedly the DC/DC power converter between the following states to supply power from the DC power source to the DC link: a voltage step-up reactor charging state to charge the reactor from the DC power source where the optional first switches in the first and second sections of the first branch (it will be readily appreciated that the first branch may include diodes instead of the first switches when the DC/DC power converter is configured to operate just in a voltage step-up mode with unidirectional power flow so to that extent the first switches can be considered to be optional) and the optional first and second switches in each second branch are switched to the 'off' state and the remaining switches in the first branch (the remaining switches will include the second switches in the first and second sections of the first branch and the switches of the intermediate sections, if any) are switched to the 'on' state such that current circulates around a current loop that includes the DC power source, the at least one reactor, and the remaining switches in the first branch; and In an embodiment, one of a plurality of voltage step-up reactor discharging states to discharge the reactor to the DC link, where the switches in the first branch and the optional first and second switches in each second branch are switched to the 'on' or 'off' state as appropriate such that current circulates around a current loop that includes the DC power source, the at least one reactor, and one or more of the energy storage devices.

The DC power source can be an energy generating device such as a fuel cell or a device that can extract energy from renewable sources like wind, wave or tidal flows, solar etc. For example, the energy generating device can be a wind turbine, a subsea turbine, a wave generator or a photovoltaic collector. In this case, the DC/DC power converter only needs to support unidirectional power flow and will be operated only in a voltage step-up mode to convert the LV input from the DC power source to a MV output.

In an arrangement, a DC/DC power converter is configured to operate in a voltage step-down, the DC/DC power converter being connectable to a DC load having first and second DC terminals and comprising: first and second DC buses respectively connectable to the first and second DC terminals of the DC load, at least one of the first and second DC buses including a reactor; third and fourth DC buses defining a DC link; N energy storage devices (e.g., capacitors) connected together in series between the third and fourth DC buses, where N≥2.

An embodiment provides a first converter leg comprising: a first branch having N sections connected together in series between the third and fourth DC buses in parallel with the N energy storage devices, the N sections including (i) a first section including a first switch connected to the third DC bus and one of a second switch and a diode connected to the first switch by a first connecting node, (ii) a second section including a first switch connected to the fourth DC bus and one of a second switch and diode connected to the first switch by a second connecting node, and (iii) optionally one or more intermediate sections between the first and second sections, each intermediate section including at least one switch or diode, wherein the first connecting node is connected to the first DC bus and the second connecting node is connected to the second DC bus.

An embodiment provides (N−1) second branches, each second branch being connected between the junction of an adjacent ith pair of the first branch sections and the junction of an adjacent ith pair of energy storage devices, where 1≤i≤(N−1). Each second branch optionally including a first switch and a second switch; wherein each switch comprises at least one controllable semiconductor switch and an anti-parallel connected freewheeling diode, each switch having an 'on' state when the at least one controllable semiconductor switch is in a conducting state and an 'off' state when the at least one controllable semiconductor switch is in a non-conducting (or blocking) state; and a controller for selectively switching the controllable semiconductor switches between the conducting state and the non-conducting (or blocking) state;

In an embodiment, controller is configured to switch repeatedly the DC/DC power converter between the following states to supply power from the DC link to the DC load: one of a plurality of voltage step-down reactor charging states to charge the reactor from the DC link, where the switches in the first branch and the optional first and second switches in each second branch are switched to the 'on' or 'off' state as appropriate such that current circulates around a current loop that includes the DC load, the at least one reactor, and one or more of the energy storage devices; and An embodiment provides a voltage step-down reactor discharging state to discharge the reactor to the DC load where the first switches in the first and second sections of the first branch and the optional first and second switches in each second branch are switched to the 'off' state and the remaining switches in the first branch are switched to the 'off' state or the diodes in the first branch conduct such that current circulates around a current loop that includes the DC load, the at least one reactor, and the remaining switches in the first branch (or more particularly, the anti-parallel connected freewheeling diodes of the remaining switches) or the diodes in the first branch.

The DC load can be any suitable load, e.g., a DC energy store, electronic equipment, an electrical machine such as a DC motor, or a variable speed drive comprising a voltage source inverter and an AC motor that is delivering power to a shaft coupling.

In this case, the DC/DC power converter only needs to support unidirectional power flow and will be operated only in a voltage step-down mode to convert the MV input from the DC link to an LV output for the DC load.

The following description normally relates to the first arrangement as it represents the more general case where the DC/DC power converter is capable of being operated in both voltage step-up and step-down modes and the current can circulate in both the first and second directions. The skilled person will understand that only the parts of the following description that refer to a voltage step-up mode will be applicable to the second arrangement and that only the parts of the following description that refer to a voltage step-down mode will be applicable to the third arrangement. Any reference below to the DC power source/load can also be taken to include a DC power source (voltage step-up mode only) or a DC load (voltage step-down mode only) as appropriate. The skilled person will also understand that, for DC/DC power converters that are capable of only being operated in a voltage step-up mode or a voltage step-down mode, it will be possible to replace certain switches with diodes to reduce complexity and cost. The following description should therefore also be taken to include such alternative DC/DC power converters wherein the first branch includes diodes at one or more of the switch locations. Where a switch can be permanently placed in the 'off' state, it can normally optionally be replaced with a diode and any reference below to the conduction of the associated freewheeling diode of such a switch would apply equally to the conduction of the replacement diode at the switch location.

During a voltage step-up reactor discharging state or a voltage step-down reactor charging state the respective current loop can include P energy storage devices (or if the DC link is considered to have N sections, each section including an energy storage device, the respective current loop can include P sections of the DC link), where 1≤P≤N. In an alternative arrangement, 1≤P≤N such that the respective current loop does not include all of the energy storage devices of the DC/DC power converter (or does not include all of the DC link sections).

In an arrangement, where N=2, the DC/DC power converter comprises a first energy storage device (or first DC link section) and a second energy storage device (or second DC link section) connected in series between the third and fourth DC buses. The first converter leg of the DC/DC power converter comprises a first branch including a first section including a first switch connected to the third DC bus and a second switch connected to the first switch by a first connecting node, and a second section including a first switch connected to the fourth DC bus and a second switch connected to the first switch by a second connecting node. There are no intermediate sections. The first converter leg of the DC/DC power converter further comprises a second branch connected between the junction of the first and second first branch sections (i.e., the junction between the second switches in the first branch) and the junction of the first and second energy storage devices. If N=2, the second branch will normally be a direct connection without any switches but the second branch can optionally include first and second switches arranged with reverse orientation. For completeness, it should be noted that the first switches in the first branch can be maintained permanently in the 'off' state or replaced with diodes for voltage step-up mode only, and the second switches in the first branch can be maintained permanently in the 'off' state or replaced with diodes for voltage step-down mode only. In the case where N≥3, this would also include any switches in an intermediate section for voltage step-down only.

The DC/DC power converter can be operated according to a switching sequence that represents the successive states adopted by the DC/DC power converter. It will be understood that when the DC/DC power converter is being operated in a voltage step-up mode there are a plurality of different voltage step-up reactor discharging states that it can adopt. Similarly, when the DC/DC power converter is being operated in a voltage step-down mode there are a plurality of different voltage step-down reactor charging states that it can adopt. Each state is determined by a unique combination of switches in the 'on' and 'off' states and represents a unique current loop that includes one energy storage device (or one DC link section) or a combination of two or more energy storage devices (or two or more DC link sections). For convenience, the various voltage step-up reactor discharging and voltage step-down charging states are represented below by a particular state number (e.g., 1, 2, 3 etc.) The voltage step-up reactor charging state and the voltage step-down reactor discharging state are represented below by the state number 0. When the DC/DC power converter is being operated in a voltage step-up mode, the switching sequence will always be such that the voltage step-up reactor charging state is interposed between the voltage step-up reactor discharging states. Similarly, when the DC/DC power converter is being operated in a voltage step-down mode, the switching sequence will always be such that the voltage step-down reactor discharging state is interposed between the voltage step-down reactor charging states.

Different switching sequences can utilise states that represent current loops that include the same number of energy storage devices (or DC link sections). For example, one switching sequence can utilise only voltage step-up reactor discharging states where each respective current loop includes one energy storage device (or one DC link section), while another switching sequence can utilise only voltage step-up reactor discharging states where each respective current loop includes two energy storage devices (or two DC link sections), and so on. The controller can select an appropriate switching sequence (i.e., an appropriate sequence of individual switching states) and can change between different switching sequences depending on operational requirements.

In the case where the current loop for each voltage step-up reactor discharging state includes only one energy storage device (or DC link section), there will be a total of N voltage step-up reactor discharging states. In a jth voltage step-up reactor discharging state, where 1≤j≤N, the switches in the first branch and the switches in each second branch are switched to the 'on' or 'off' state as appropriate such that current circulates in a first direction around a current loop that includes the DC power source/load, the at least one reactor, and only the jth energy storage device. Similarly, in the case where the current loop for each voltage step-down reactor charging state includes only one energy storage device (or DC link section), there will be N voltage step-down reactor charging states. In a jth voltage step-down reactor charging state, where 1≤j≤N, the switches in the first branch and the switches in each second branch are switched to the 'on' or 'off' state as appropriate such that current circulates in a second direction around a current loop that includes the DC power source/load, the at least one reactor, and only the jth energy storage device.

In the arrangement where N=2, the DC/DC power converter, if adapted to be operated in both voltage step-up and step-down modes, can adopt the following states where each respective current loop includes only one of the first and second energy storage devices (or only one of the first and second DC link sections):a first voltage step-up reactor discharging state where the current circulates in a first direction around a current loop that includes the first energy storage device (or first DC link section).

An embodiment provides a second voltage step-up reactor discharging state where the current circulates in a first direction around a current loop that includes the second energy storage device (or second DC link section), a first voltage step-down reactor charging state where the current circulates in a second direction around a current loop that includes the first energy storage device (or first DC link section), and a second voltage step-down reactor charging state where the current circulates in a second direction around a current loop that includes the second energy storage device (or second DC section).

It will be readily understood that if the DC/DC power converter is adapted to be operated only in the voltage step-up mode, it will adopt only the first and second voltage step-up reactor discharging states and if the DC/DC power converter is adapted to be operated only in the voltage step-down mode, it will adopt only the first and second voltage step-down reactor charging states.

In one arrangement, where N=2, when the DC/DC power converter is operated in the voltage step-up mode, the controller can be configured to switch repeatedly the DC/DC power converter between the voltage step-up reactor charging state, the first voltage step-up reactor discharging state, the voltage step-up reactor charging state, the second voltage step-up reactor discharging state, the voltage step-up reactor charging state, the first voltage step-up reactor discharging state, the voltage step-up reactor charging state, the second voltage step-up reactor discharging state, and so on (e.g., 0, 1, 0, 2, 0, 1, 0, 2, . . . ) as a switching sequence. Similarly, when the DC/DC power converter is operated in the voltage step-down mode, the controller can be configured to switch repeatedly the DC/DC power converter between the voltage step-down reactor discharging state, the first voltage step-down reactor charging state, the voltage step-down reactor discharging state, the second voltage step-down reactor charging state, the voltage step-down reactor discharging state, the first voltage step-down reactor charging state, the voltage step-down reactor discharging state, the second voltage step-down reactor charging state, and so on (e.g., 0, 1, 0, 2, 0, 1, 0, 2, . . . ) as a switching sequence.

For each of the jth voltage step-up and step-down states, where 1≤j≤N, the current circulates through the jth energy storage device (or the jth DC link section). More particularly, for the first voltage step-up reactor discharging state and the first voltage step-down reactor charging state the current circulates through the first energy storage device (or first DC link section), for the second voltage step-up reactor discharging state and the second step-down reactor charging state the current circulates through the second energy storage device (or second DC section), and so on.

In the arrangement where N=2, the DC/DC power converter, if adapted to be operated in both voltage step-up and step-down modes, can also adopt the following states where each respective current loop includes both the first and second energy storage devices (or both of the first and second DC link sections): a third voltage step-up reactor discharging state where the current circulates in a first direction around a current loop that includes the first and second energy storage devices (or both the first and second DC link sections), and a third voltage step-down reactor charging state where the current circulates in a second direction around a current loop that includes the first and second energy storage devices (or both the first and second DC link sections).

In one arrangement, where N=2, when the DC/DC power converter is operated in the voltage step-up mode, the controller can be configured to switch repeatedly the DC/DC power converter between the voltage step-up reactor charging state, the third voltage step-up reactor discharging state, the voltage step-up reactor charging state, the third voltage step-up reactor discharging state, and so on (e.g., 0, 3, 0, 3, . . . ) as a switching sequence. Similarly, when the DC/DC power converter is operated in the voltage step-down mode, the controller can be configured to switch repeatedly the DC/DC power converter between the voltage step-down reactor discharging state, the third voltage step-down reactor charging state, the voltage step-down reactor discharging state, the third voltage step-down reactor charging state, and so on (e.g., 0, 3, 0, 3, . . . ) as a switching sequence.

During a voltage step-up mode, the voltage ($V_C$) across an energy storage device (or DC link section) for a particular voltage step-up reactor discharging state is given by:

$$V_C = \left(\frac{1}{K}\right)\frac{V}{(1-D)}, 0 \leq D < 1$$

where: K is an integer that represents the number of energy storage devices that are included in the current path for the particular switching state, where 1≤K≤N, V is the voltage at the DC power source/load, and D is the duty cycle. As used herein, the duty cycle is defined as the fraction of the total reactor charging and discharging period during which the particular reactor charging or discharging state is applied by the controller.

The DC link voltage $V_{DC}$ between the third and fourth DC buses for a particular voltage step-up reactor discharging state is given by:

$$V_{DC} = \sum_{i=1}^{N} V_{Ci} = \left(\frac{1}{K}\right)\sum_{i=1}^{N} \frac{V}{(1-D_i)}, 0 \leq D_i < 1$$

If the voltages across all N of the energy storage devices (or DC link sections) are controlled to be substantially identical, the DC link voltage between the third and fourth DC buses for a particular voltage step-up reactor discharging state is given by:

$$V_{DC} = NV_C = \left(\frac{N}{K}\right)\frac{V}{(1-D)}, 0 \leq D < 1$$

During a voltage step-down mode, the voltage at the DC power source/load for a particular voltage step-down reactor charging state is given by:

$$V = \left(\frac{K}{N}\right)\sum_{i=1}^{N} V_{Ci} \cdot D_i, \quad 0 \le D_i \le 1$$

If the voltages across all N of the energy storage devices (or DC link sections) are controlled to be substantially identical, the voltage at the DC power source/load for a particular step-down reactor charging state is given by:

$$V = \left(\frac{K}{N}\right)(V_{DC} \cdot D), \quad 0 \le D \le 1$$

The voltages across the energy storage devices can be controlled independently and do not have to be substantially identical and will depend on the switching period for each state over the complete switching cycle. This independent voltage control is carried out by controlling the duty cycle for each switching state, i.e., $D_i$.

The duty cycle for each switching state, i.e., $D_i$ can be calculated by a voltage controller for the respective DC link section and can be adjusted dynamically to meet its individual control requirements. It will be understood that the duty cycles can vary, even when each DC link section is controlled to have the same voltage, to compensate for voltage discrepancies, e.g., caused by hardware. The voltage conversion equation defined by using the duty cycle defined above is application for continuous mode operation. For discontinuous mode operation a different relationship between the voltage conversion equation and the duty cycle can be used.

A switching sequence that utilises voltage step-up reactor discharging states or voltage step-down reactor charging states that represent current loops that include the same number of energy storage devices (or DC link sections), i.e., where K is the same, will provide a DC link voltage or a voltage at the DC power source/load that corresponds to the voltages described above whilst the particular switching sequence is applied by the controller.

The controller can select an appropriate switching sequence depending on operational requirements. Consequently, when N=2, the controller might switch the DC/DC power converter between a first switching sequence with voltage step-up reactor discharging states or voltage step-down reactor charging states where current circulates through one of the energy storage devices (e.g., 0, 1, 0, 2, 0, 1, 0, 2, . . . where K=1) and a second switching sequence with voltage step-up reactor discharging states or voltage step-down reactor charging states where current circulates through both energy storage devices (e.g., 0, 3, 0, 3, . . . where K=2), for example. The controller can switch between different switching sequences based on a relationship between the voltage at the DC power source and the voltage across at least one of the energy storage devices (or DC link sections). For example, in an arrangement where N=2 and the voltage across each of the energy storage devices (or DC link sections) is controlled to be substantially identical, the controller might use a first switching sequence where the current circulates through one of the energy storage devices (e.g., 0, 1, 0, 2, 0, 1, 0, 2, . . . where K=1) when $V \le V_C$ but a second switching sequence where the current circulates through both of the energy storage devices (e.g., 0, 3, 0, 3, . . . where K=2) when $V_C < V \le 2V_C$. This can be useful in situations where the voltage at the DC power source/load varies during operation.

In another arrangement, where N=2, when the DC/DC power converter is operated in the voltage step-up mode, the controller can be configured to switch repeatedly the DC/DC power converter between the voltage step-up reactor charging state and the first voltage step-up reactor discharging state or between voltage step-up reactor charging state and the second voltage step-up reactor discharging state (e.g., 0, 1, 0, 1, . . . or 0, 2, 0, 2, . . . ). Similarly, when the DC/DC power converter is operated in the voltage step-down mode, the controller can be configured to switch repeatedly the DC/DC power converter between the voltage step-down reactor discharging state and the first voltage step-down reactor charging state or between the voltage step-down reactor discharging state and the second voltage step-down reactor charging state (e.g., 0, 1, 0, 1, . . . or 0, 2, 0, 2, . . . ) as a switching sequence. With these switching sequences, it will be understood that the current is not circulated at all through one of the energy storage devices (or DC link sections) during the duration of the switching sequence. This offers flexibility of DC link utilisation and redundancy. For example, if N=2 and K=1, then $V \le V_C$ or $V \le 0.5V_{DC}$ if just one of the DC link sections is operational. In such an arrangement, the DC link will normally further be defined by an additional fifth DC bus connected to the junction between the first and second energy storage devices. A DC link voltage will be derived between the third and fifth DC bus and/or between the fourth and fifth DC bus as appropriate. In general terms, where N≥2, there can be up to (N−1) additional DC buses where each ith additional DC bus is connected to the junction of an adjacent ith pair of energy storage devices.

In an arrangement where N=3, the DC/DC power converter, if adapted to be operated in both voltage step-up and step-down modes, can adopt the following states where each respective current loop includes only one energy storage device (or only one DC link section), i.e., where K=1: a first voltage step-up reactor discharging state where the current circulates in a first direction around a current loop that includes the first energy storage device (or first DC link section).

An embodiment provides a second voltage step-up reactor discharging state where the current circulates in a first direction around a current loop that includes the second energy storage device (or second DC link section), a third voltage step-up reactor discharging state where the current circulates in a first direction around a current loop that includes the third energy storage device (or third DC link section), a first voltage step-down reactor charging state where the current circulates in a second direction around a current loop that includes the first energy storage device (or first DC link section), a second voltage step-down reactor charging state where the current circulates in a second direction around a current loop that includes the second energy storage device (or second DC link section), and a third voltage step-down reactor charging state where the current circulates in a second direction around a current loop that includes the third energy storage device (or third DC link section).

It will be understood that the DC/DC power converter, if adapted to be operated in both voltage step-up and step-down modes, can also adopt the following states: a voltage step-up reactor charging state where the current circulates in a first direction around a current loop that includes the DC power source/load, the at least one reactor, the second switches of the first and second sections of the first branch, and the at least one switch of the intermediate section of the first branch.

An embodiment provides a voltage step-down reactor discharging state where the current circulates in a second direction around a current loop that includes the DC power source/load, the at least one reactor, the second switches of the first and second sections of the first branch (or more particularly, the anti-parallel connected freewheeling diodes of the second switches), and the at least one switch of the intermediate section of the first branch (or more particular, the anti-parallel connected freewheeling diodes of the at least one switch).

In one arrangement, where N=3, when the DC/DC power converter is operated in the voltage step-up mode, the controller can be configured to switch repeatedly the DC/DC power converter between the voltage step-up reactor charging state, the first voltage step-up reactor discharging state, the voltage step-up reactor charging state, the second voltage step-up reactor discharging state, the voltage step-up reactor charging state, the third voltage step-up reactor discharging state, the voltage step-up reactor charging state, the first voltage step-up reactor discharging state, the voltage step-up reactor charging state, the second voltage step-up reactor discharging state, the voltage step-up reactor charging state, the third voltage step-up reactor discharging state, and so on (e.g., 0, 1, 0, 2, 0, 3, . . . ) as a switching sequence.

Similarly, when the DC/DC power converter is operated in the voltage step-down mode, the controller can be configured to switch repeatedly the DC/DC power converter between the voltage step-down reactor discharging state, the first voltage step-down reactor charging state, the voltage step-down reactor discharging state, the second voltage step-down reactor charging state, the voltage step-down reactor discharging state, the third voltage step-down reactor charging state, the voltage step-down reactor discharging state, the first voltage step-down reactor charging state, the voltage step-down reactor discharging state, the second voltage step-down reactor charging state, the voltage step-down reactor discharging state, the third voltage step-down reactor charging state, and so on (e.g., 0, 1, 0, 2, 0, 3, . . . ) as a switching sequence. Other switching sequences are possible, e.g., 0, 3, 0, 2, 0, 1, . . . , 0, 3, 0, 1, 0, 2, . . . , 0, 1, 0, 2, 0, 1, 0, 2, . . . , 0, 2, 0, 3, 0, 2, 0, 3, . . . , 0, 1, 0, 3, 0, 1, 0, 3, . . . , 0, 1, 0, 1, . . . , 0, 2, 0, 2, . . . or 0, 3, 0, 3, . . . depending on the operating requirements of the DC/DC power converter, including if the voltages across the energy storage devices are controlled to be substantially identical or are independently controlled.

In an arrangement where N=3, the DC/DC power converter, if adapted to be operated in both voltage step-up and step-down modes, can adopt the following states where each respective current loop includes two energy storage devices (or two DC link sections), i.e., where K=2: a fourth voltage step-up reactor discharging state where the current circulates in a first direction around a current loop that includes the first and second energy storage devices (or first and second DC link sections).

An embodiment provides a fifth voltage step-up reactor discharging state where the current circulates in a first direction around a current loop that includes the second and third energy storage devices (or second and third DC link sections).

An embodiment provides a sixth voltage step-up reactor discharging state where the current circulates in a first direction around a current loop that includes the first and third energy storage devices (or first and third DC link sections).

An embodiment provides a fourth voltage step-down reactor charging state where the current circulates in a second direction around a current loop that includes the first and second energy storage devices (or first and second DC link sections).

An embodiment provides a fifth voltage step-down reactor charging state where the current circulates in a second direction around a current loop that includes the second and third energy storage devices (or second and third DC link sections).

An embodiment provides a sixth voltage step-down reactor charging state where the current circulates in a second direction around a current loop that includes the first and third energy storage devices (or first and third DC link sections).

In one arrangement, where N=3, when the DC/DC power converter is operated in the voltage step-up mode, the controller can be configured to switch repeatedly the DC/DC power converter between the voltage step-up reactor charging state, the fourth voltage step-up reactor discharging state, the voltage step-up reactor charging state, the fifth voltage step-up reactor discharging state, the voltage step-up reactor charging state, the sixth voltage step-up reactor discharging state, and so on (e.g., 0, 4, 0, 5, 0, 6, . . . ) as a switching sequence. Similarly, when the DC/DC power converter is operated in the voltage step-down mode, the controller can be configured to switch repeatedly the DC/DC power converter between the voltage step-down reactor discharging state, the fourth voltage step-down reactor charging state, the voltage step-down reactor discharging state, the fifth voltage step-down reactor charging state, the voltage step-down reactor discharging state, the sixth voltage step-down reactor charging state, and so on (e.g., 0, 4, 0, 5, 0, 6, . . . ) as a switching sequence. Other switching sequences are possible, e.g., 0, 6, 0, 5, 0, 4, . . . , 0, 4, 0, 4, . . . , 0, 5, 0, 5, . . . , 0, 6, 0, 6, . . . , 0, 4, 0, 5, 0, 4, 0, 5, . . . , 0, 5, 0, 6, 0, 5, 0, 6, . . . , or 0, 4, 0, 6, 0, 4, 0, 6, . . . depending on the operating requirements of the DC/DC power converter.

In an arrangement where N=3, the DC/DC power converter, if adapted to be operated in both voltage step-up and step-down modes, can adopt the following states where each respective current loop includes all three energy storage devices (or all three DC link sections), i.e., where K=3: a seventh voltage step-up reactor discharging state where the current circulates in a first direction around a current loop that includes the first, second and third energy storage devices.

An embodiment provides a seventh voltage step-down reactor charging state where the current circulates in a second direction around a current loop that includes the first, second and third energy storage devices.

In one arrangement, where N=3, when the DC/DC power converter is operated in the voltage step-up mode, the controller can be configured to switch repeatedly the DC/DC power converter between the voltage step-up reactor charging state, the seventh voltage step-up reactor discharging state, the voltage step-up reactor charging state, the seventh voltage step-up reactor discharging state, and so on (e.g., 0, 7, 0, 7, . . . ) as a switching sequence. Similarly, when the DC/DC power converter is operated in the voltage step-down mode, the controller can be configured to switch repeatedly the DC/DC power converter between the voltage step-down reactor discharging state, the seventh voltage step-down reactor charging state, the voltage step-down reactor discharging state, the seventh voltage step-down reactor charging state, and so on (e.g., 0, 7, 0, 7, . . . ) as a switching sequence.

As noted above, the controller can select an appropriate switching sequence depending on operational requirements. Consequently, when N=3, the controller might switch the DC/DC power converter between a first switching sequence with states where current circulates through one of the energy storage devices (e.g., 0, 1, 0, 2, 0, 3, . . . or 0, 3, 0, 2, 0, 1, . . . where K=1), a second switching sequence with states where current circulates through two of the energy storage devices (e.g., 0, 4, 0, 5, 0, 6, . . . , or 0, 6, 0, 5, 0, 4, . . . or 0, 4, 0, 6, 0, 5, . . . or 0, 4, 0, 4, . . . etc. where K=2), and a third switching sequence with states where current circulates through all three of the energy storage devices (e.g., 0, 7, 0, 7, . . . where K=3), for example. In general terms, the controller can switch the DC/DC power converter between switching sequences that have the same value of K and/or between switching sequences that have different values of K as necessary.

The controller can switch between different switching sequences based on a relationship between the voltage at the DC power source and the voltage across at least one of the energy storage devices (or DC link section). For example, in an arrangement where N=3 and the voltage across each of the energy storage device (or DC link sections) is controlled to be substantially identical, the controller might use a first switching sequence with states where current circulates through one of the energy storage devices (e.g., 0, 1, 0, 2, 0, 3, . . . or 0, 3, 0, 2, 0, 1, . . . or 0, 1, 0, 3, 0, 2, . . . where K=1) when $V \leq V_C$, a second switching sequence with states where current circulates through two of the energy storage devices (e.g., 0, 4, 0, 5, 0, 6, . . . , or 0, 4, 0, 4, . . . etc. where K=2) when $V_C < V \leq 2V_C$, and a third switching sequence with states where current circulates through all three of the energy storage devices (e.g., 0, 7, 0, 7, . . . where K=3) when $2V_C < V \leq 3V_C$. The controller might use different switching sequences with the same value of K for independent control of voltages across the DC link sections.

For ease of explanation, the various switching sequences have been described above for the arrangement where N=2, and the arrangement where N=3 but it will be readily understood that switching sequences can be similarly derived for DC/DC power converters where N>3 for both voltage step-up and step-down modes as required.

The DC/DC power converter can be operated in continuous and discontinuous modes as required. It will be readily appreciated that in a continuous mode, the current through the at least one reactor does not fall to zero during a switching period. In a discontinuous mode, the current through the at least one reactor falls to zero during part of the switching period and the at least one reactor is completely discharged.

The individual voltages across each of the energy storage devices ($V_C$) are less than the DC link voltage. This reduces the voltage requirement for the switches. It also reduces current ripple in the DC link voltage, which significantly benefits the reactor design. In some arrangements, current ripple can be reduced by at least 50% as compared with conventional DC/DC power converters.

The DC/DC power converter provides better efficiency and a reduction in physical size and cost. This provides a significant benefit of high voltage conversion ratio with smaller reactors and lower switching losses.

The DC/DC power converter offers flexible operation and allows for partial DC link voltage utilisation because independent DC voltage control can be applied to individual DC link sections.

The DC/DC power converter provides improved redundancy. In particular, the DC/DC power converter can still operate if one or more of the DC link sections is faulty or non-operational for any reason. Each DC link section can be connected to a respective DC power source or DC load such that the DC/DC power converter is connected to a plurality of power sources or loads on the MV side. Redundancy is also increased by using different switching states. For example, if a switch is faulty, the DC/DC power converter can often be kept operational by utilising the voltage step-up reactor discharging states or voltage step-down reactor charging states that do not require the faulty switch and adjusting the duty cycle as appropriate.

The DC/DC power converter can be used to provide a direct DC/DC connection between LV and MV levels without the need for a DC/AC and AC/DC connection with an interposing transformer.

To provide additional voltage capability, each switch can include two or more controllable semiconductor switches connected in series and/or parallel which are switched simultaneously by the controller. In this case, each controllable semiconductor switch will include its own anti-parallel connected freewheeling diode. The controllable semiconductor switch and freewheeling diode can be co-packaged or provided as separate components. The controllable semiconductor switches can be any suitable power semiconductor devices, e.g., IGBTs, MOSFETS, JFETs etc. Not all of the switches need have two or more controllable switches connected in series and/or parallel. For example, the first switches in the first and second sections of the first branch will sometimes experience higher voltage stress than the remaining switches in the first branch. Each first switch might therefore include two or more controllable switches connected in series whereas each remaining switch in the first branch might include just one controllable switch. Conventional protection schemes such as snubber circuits and active gating control for power semiconductor devices can be utilised.

The voltage control scheme for each DC link section can adopt conventional voltage control such as feedback proportional integral (PI) control, state space control, feedforward control etc. The modulation method for pulse width modulation (PWM) control of the semiconductor switches can also adopt conventional methods such as carrier based modulation, space vector modulation, sliding mode modulation etc.

The switches in the first branch are arranged with the same orientation. In other words, the controllable semiconductor switches are arranged to allow current to flow through the first branch in a predetermined direction. It follows that the freewheeling diodes, because they are arranged in anti-parallel, are similarly arranged to allow current to flow through the second branch in a direction that is opposite to the predetermined direction.

As noted above, where N=2, the first converter leg includes only one second branch and this can be a direct connection between the junction of the first and second sections of the first branch and the junction of the first and second energy storage devices. In other words, there is no need for the second branch to include any switches. Where N≥3, there will be (N−1) second branches and each second branch must include a first switch and a second switch to prevent the DC link from being short circuited during certain operating states of the DC/DC power converter. The first and second switches in each second branch are arranged with reverse orientation. In other words, the controllable semiconductor switch of the first switch is arranged to allow current to flow through the second branch in a predetermined direction and the controllable semiconductor switch of the second switch is arranged to allow current to flow through the second branch in a direction that is opposite to the predetermined direction.

Each energy storage device can comprise two or more capacitors connected together in series or parallel.

A reactor can be optionally provided in both the first and second DC buses. The reactors can be provided as a magnetically coupled reactor where the coils in the first and second DC buses are wound on a single magnetic core. The coils in the first and second DC buses can be mutually, additively, coupled in order to provide any desired differential mode reactance and where the leakage component of reactance may provide a desired common mode reactance. The DC/DC power converter can include Q converter legs, where Q≥2, connected in parallel between the third and fourth DC buses. The controller might control the switching of the controllable semiconductor switches such that the converter legs are phase shifted with respect to each other to reduce ripple current. Such phase shifted converter legs might be described as being "interleaved". The phase shift might be determined with reference to the value of Q. The respective first and second DC buses are connected in parallel to the DC power source/load. The respective (N−1) second branches are connected in parallel to the junction of the adjacent ith pair of energy storage devices. For example, in an arrangement where N=2 and Q=3, the three first DC buses are connected in parallel to the first DC terminal of the DC power source/load, the three second DC buses are connected in parallel to the second DC terminal of the DC power source/load, and the three second branches are connected in parallel to the junction between the first and second energy storage devices.

The first DC bus can be a positive DC bus and the second DC bus can be a negative DC bus or vice versa.

The third DC bus can be a positive DC bus and the fourth DC bus can be a negative DC bus or vice versa.

The DC buses can define DC terminals of the DC/DC power converter. For example, the first and second DC buses can define first and second LVDC terminals that are connected to the first and second DC terminals of the DC power source/load, respectively. The third and fourth DC buses can define third and fourth MVDC terminals. If the DC/DC power converter includes optional additional DC buses on the MV side as discussed above, each additional DC bus can define an additional MVDC terminal.

Two or more DC/DC power converters can be connected to the same DC power source/load. In this case, each DC/DC power converter might be described as a converter module. For example, the respective first DC terminals of the DC/DC power converters can be connected in parallel to the first DC terminal of the DC power source/load and the respective second DC terminals of the DC/DC power converters can be connected in parallel to the second DC terminal of the DC power source/load such that the DC/DC power converters are inter-connected in parallel on the LV side. The DC/DC power converters can be inter-connected in series on the MV side. In other words, the third DC terminal of the first DC/DC power converter in the series can define a first main DC terminal, the fourth DC terminal of the first DC/DC power converter in the series can be connected to the third DC terminal of the next DC/DC power converter in the series, and so on, where the fourth DC terminal of the last DC/DC power converter in the series can define a second main DC terminal. The first and second main DC terminals can then be connected to an inverter, for example. A third main DC terminal might also be provided and connected to the fourth and third DC terminals of an intermediate pair of DC/DC power converters in the series.

The third and fourth DC terminals (and any additional DC terminals, if present) can also be inter-connected in any other arrangement, e.g., a parallel or series-parallel arrangement.

DETAILED DESCRIPTION

DC/DC Power Converter, N=2

Figure 1A:
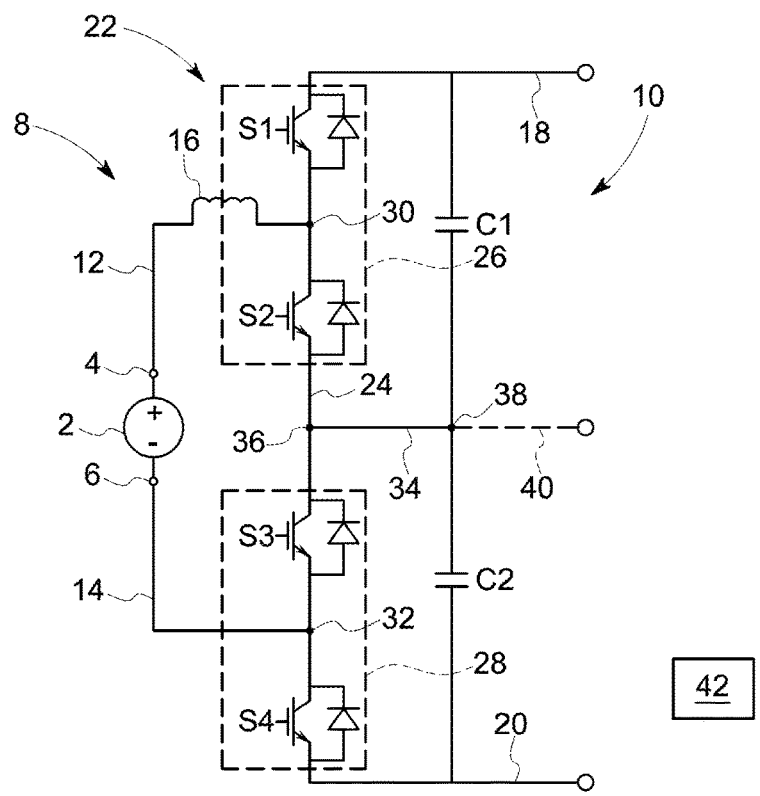
FIG. 1A is a circuit diagram of a first DC/DC power converter for voltage step-up/step-down operation, where N=2.

FIG. 1A shows a DC/DC power converter 8, where N=2. The DC/DC power converter 8 is connected to a DC power source/load 2 having a first DC terminal 4 and a second DC terminal 6. The DC power source/load 2 is an energy storage device that is capable of being charged and discharged, e.g., a battery, ultra-capacitor or super-capacitor.

The DC/DC power converter 8 is configured to operate selectively in a voltage step-up mode (for discharging the DC power source/load 2 to a DC link 10) and a voltage step-down mode (for charging the DC power source/load from the DC link) as required.

The DC/DC power converter 8 includes a first DC bus 12 connected to the first DC terminal 4 of the DC power source/load 2, and a second DC bus 14 connected to the second DC terminal 6 of the DC power source/load. The first DC bus 12 includes a reactor (or inductor) 16. The DC/DC power converter 8 also includes a third DC bus 18 and a fourth DC bus 20. The third and fourth DC buses 18, 20 define a DC link 10 of the DC/DC power converter 8.

The DC/DC power converter 8 includes two capacitors C1, C2 connected together in series between the third and fourth DC buses 18, 20. Each capacitor C1, C2 represents a DC link section. Although not shown, it will be readily appreciated that each DC link section can include two or more capacitors connected in series or parallel. The capacitors C1, C2 will, in an embodiment, have the same capacitance.

A converter leg 22 of the DC/DC power converter 8 includes a first (vertical) branch 24 with a first section 26 and a second section 28 connected together in series between the third and fourth DC buses 18, 20 and in parallel with the series-connected capacitors C1, C2. So it will be clear that because N=2, the DC/DC power converter 8 has two capacitors C1, C2 (or two DC link sections) and two sections 26, 28 in the first branch 24.

The first section 26 includes a first switch 51 and a second switch S2 connected by a first connecting node 30. The second section 28 includes a first switch S4 and a second switch S3 connected by a second connecting node 32. The first connecting node 30 is connected to the first DC bus 12 and the second connecting node 32 is connected to the second DC bus 14.

The converter leg 22 also include a second (horizontal) branch 34 that is connected between the junction 36 of the first and second sections 24, 26 and the junction 38 of the first and second capacitors C1, C2. For an arrangement where N=2, the second branch 34 can be a direct connection or can optionally include first and second switches arranged with reverse orientation as described in more detail below. If such optional first and second switches are provided, they can be maintained in an 'on' state at all times.

Each switch S1, S2, . . . S4 (and the optional switches in the second branch 34) includes a controllable semiconductor switch (an IGBT is shown but other semiconductor switching devices could be used instead) and an anti-parallel connected freewheeling diode. The switches S1, S2, . . . S4 are arranged with the same orientation. Each switch has an 'on' state when the controllable semiconductor switch is in a conducting state and an 'off' state when the controllable semiconductor switch is in a non-conducting (or blocking) state. The controllable semiconductor switches are controlled in a conventional manner, e.g., by using a gate driver to apply a gate drive signal to the gate terminal of the controllable semiconductor switch). A controller 42 controls the gate drivers (not shown) to selectively control the switching of the controllable semiconductor switches between the conducting and non-conducting states.

The third and fourth DC buses 18, 20 can be connected to a DC power distribution system, a DC grid, an inverter, or a DC load or DC power source (not shown), for example.

As described in more detail below, when the DC power source/load 2 is being discharged, the DC/DC power converter will be operated in a voltage step-up mode to convert the low voltage (LV) input from the DC power source/load to a medium voltage (MV) output at the DC link 10. When the DC power source/load 2 is being charged, it is acting as a DC load and the DC/DC power converter 8 will be operated in a voltage step-down mode to convert the MV input from the DC link 10 to an LV output for the DC power source/load.

FIG. 1A also shows an optional fifth DC bus 40 connected to the junction 38 between the first and second capacitors C1, C2 if there is a requirement to provide two separate DC link voltages, i.e., a first DC link voltage between the third and fifth DC buses and a second DC link voltage between the fifth and fourth DC buses. The following description typically assumes that only one DC link voltage is provided between the third and fourth DC buses 18, 20.

Figure 1B:
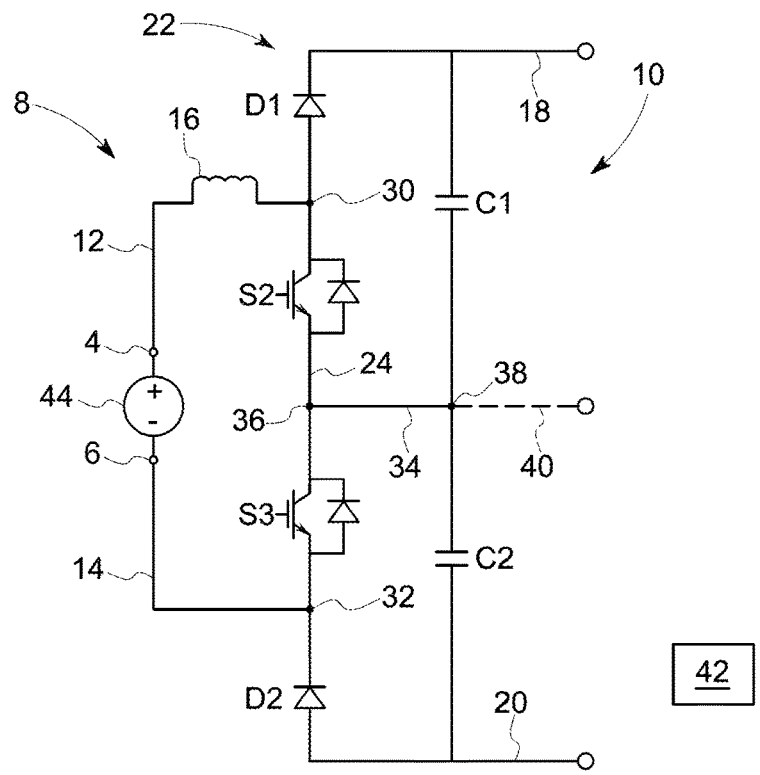
FIG. 1B is a circuit diagram of a second DC/DC power converter for voltage step-up operation, where N=2.

If the DC/DC power converter 8 is configured to operate only in a voltage step-up mode, the first switches S1 and S4 can be maintained permanently in the 'off' state or replaced with diodes D1 and D2 as shown in FIG. 1B. In this case, the DC/DC power converter 8 can be connected to a DC power source 44 that can be an energy generating device such as a fuel cell or a device that can extract energy from renewable sources like wind, wave or tidal flows, solar etc.

Figure 1C:
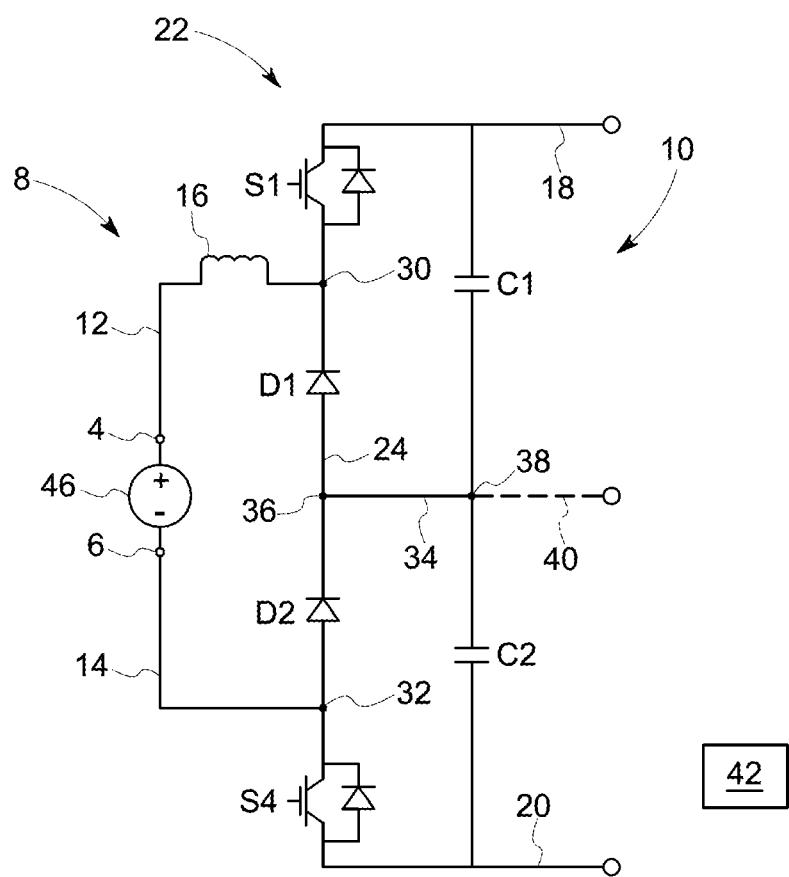
FIG. 1C is a circuit diagram of a third DC/DC power converter for voltage step-down operation, where N=2.

If the DC/DC power converter 8 is configured to operate only in a voltage step-down mode, the second switches S2 and S3 can be maintained permanently in the 'off' state or replaced with diodes D1 and D2 as shown in FIG. 1C. In this case, the DC/DC power converter 8 can be connected to a DC laod 46 such as a DC energy store, electronic equipment, an electrical machine such as a DC motor, or a variable speed drive comprising a voltage source inverter and an AC motor that is delivering power to a shaft coupling.

The operation of the DC/DC power converter shown in FIG. 1A will now be described for both voltage step-up and step-down modes.

Voltage Step-Up Mode, N=2

Figure 2:
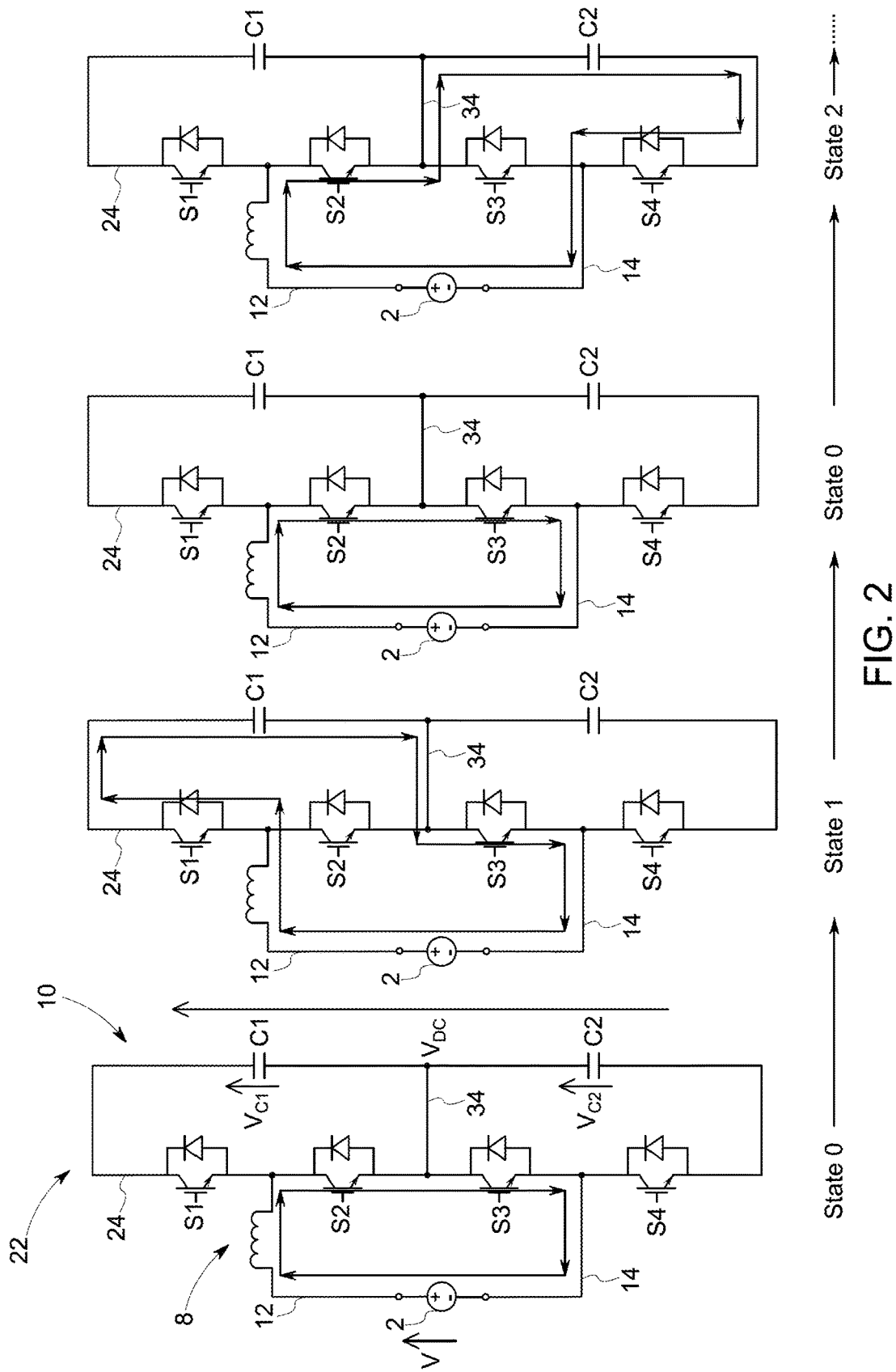
FIG. 2 is circuit diagrams showing switching states of a first switching sequence of the first DC/DC power converter of FIG. 1A in a voltage step-up mode.

FIG. 2 shows one voltage step-up reactor charging state and two voltage step-up reactor discharging states where the current loop includes only one of the capacitors C1, C2 (or DC link sections). In particular, the DC/DC power converter 8 can adopt the following states: a voltage step-up reactor charging state (State 0), a first voltage step-up reactor discharging state (State 1), and a second voltage step-up reactor discharging state (State 2).

The arrows in FIG. 2 with "stealth style" arrowheads indicate the direction of current circulation through the DC/DC power converter 8 during a particular switching state. Other arrows with "open style" arrowheads indicate the various voltages.

It will be readily appreciated that during a voltage step-up mode, the first switches S1, S4 are maintained in the 'off' state at all times. Only the second switches S2, S3 are switched by the controller to switch repeatedly the DC/DC power converter between the voltage step-up reactor charging state, the first voltage step-up reactor discharging state, the voltage step-up reactor charging state, the second voltage step-up reactor discharging state, the voltage step-up reactor charging state, the first voltage step-up reactor discharging state, the voltage step-up reactor charging state, the second voltage step-up reactor discharging state, and so on (e.g., 0, 1, 0, 2, 0, 1, 0, 2, . . . ) as a switching sequence. The current loop for each of the states is shown in FIG. 2 and the particular switching arrangement of the switches S1, S2, . . . S4 that the controller uses to derive each state can be summarised in Table 1 where * indicates that the associated freewheeling diode conducts when the controllable semiconductor switch is in the 'off' state:

TABLE 1

|  | S1 | S2 | S3 | S4 |
|---|---|---|---|---|
| State 0 | off | on | on | off |
| State 1 | off* | off | on | off |
| State 2 | off | on | off | off* |

Figure 3:
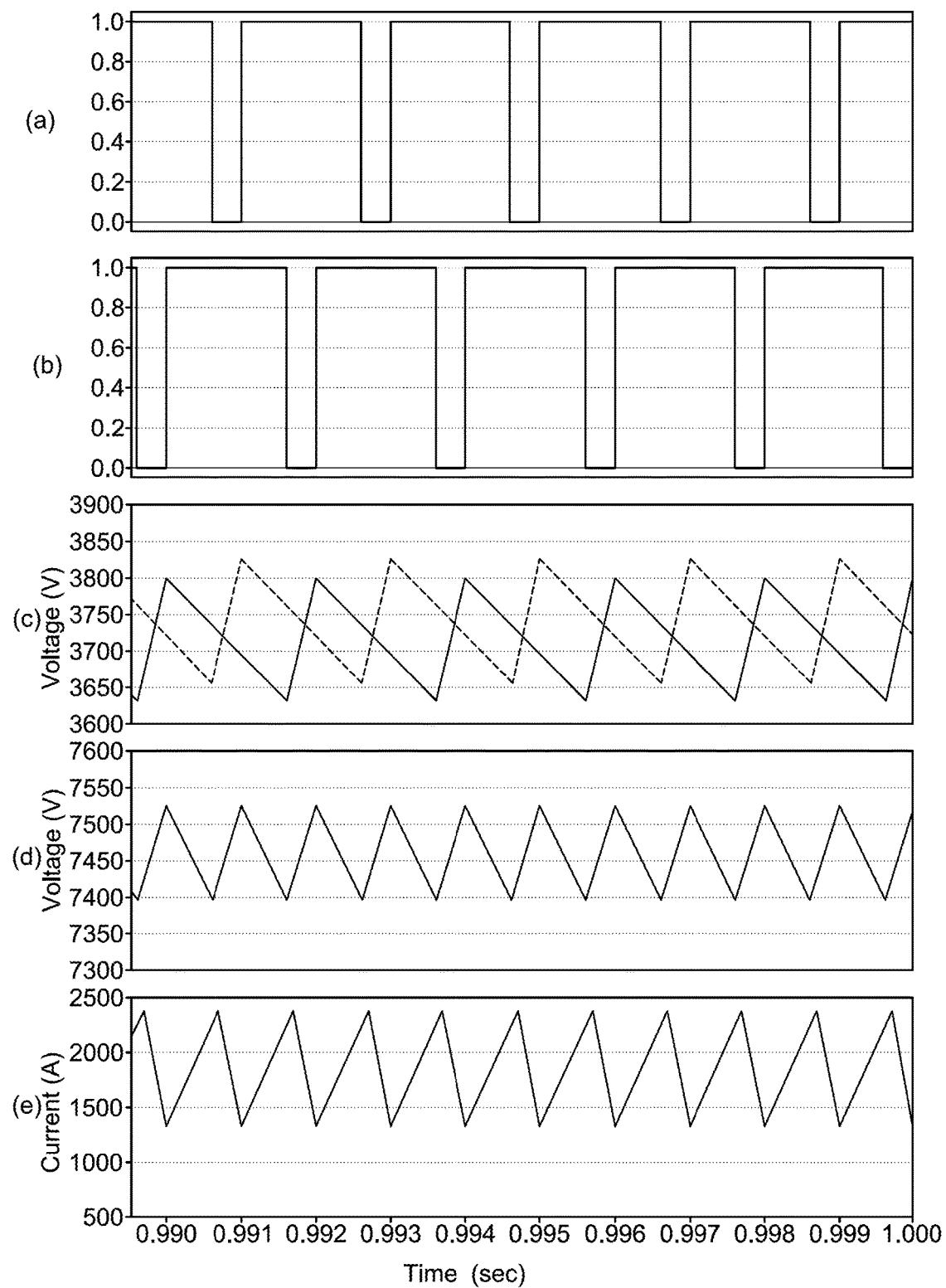
FIG. 3 is waveforms for the first switching sequence of FIG. 2.

FIG. 3 shows various waveforms for the switching sequence of FIG. 2. In particular, waveforms (a) and (b) show the switching patterns for the second switches S2 and S3, respectively, with respect to time, where a value of 1 indicates that the switch is in the 'on' state and a value of 0 indicates that the switch is in the 'off' state, waveform (c) shows the capacitor voltages $V_{C1}$ and $V_{C2}$ i.e., the voltage across the first capacitor C1 (dashed line) and the voltage across the second capacitor C2 (solid line) with respect to time, waveform (d) shows the DC link voltage $V_{DC}$ with respect to time, and waveform (e) shows the reactor current with respect to time.

The DC/DC power converter 8 is operated under the following conditions: the voltage V supplied by the DC power source/load 2 is 1500 VDC, the duty ratio D is 0.6, the switching frequency is 500 Hz, the reactor inductance is 500 µH, the power in the DC link 10 is 4 MW, and the DC/DC power converter 8 is controlled such that the capacitor voltages $V_{C1}$ and $V_{C2}$ are substantially identical (i.e., $2V_C = V_{C1} + V_{C2}$).

For the voltage step-up reactor discharging states utilised in the switching sequence of FIG. 2, N=2 and K=1. The DC link voltage $V_{DC}$ derived during operation of the DC/DC power converter 8 when the switching sequence of FIG. 2 is applied by the controller 42 is given by:

$$V_{DC} = 2V_C = 2\frac{1500}{(1-0.6)}$$

Hence, for this particular switching sequence the capacitor voltage $V_C$ is 3750 VDC and the DC link voltage $V_{DC}$ is 7500 VDC.

Although not described here in detail, it will be understood that an alternative switching sequence of 0, 1, 0, 1, . . . or 0, 2, 0, 2, . . . could also be used if appropriate. If a first DC link voltage $V_{DC1}$ is between the third and fifth DC buses 18, 40 and a second DC link voltage $V_{DC2}$ is between the fifth and fourth DC buses 40, 20, then it can be seen that for a switching sequence of 0, 1, 0, 1, . . . , $V_{DC1}$ is 3750 VDC and $V_{DC2}$ is zero which can be useful if only the first DC link section is operational. Similarly, for a switching sequence of 0, 2, 0, 2, . . . , $V_{DC1}$ is zero and $V_{DC2}$ is 3750 VDC which can be useful if only the second DC link section is operational.

Figure 4:
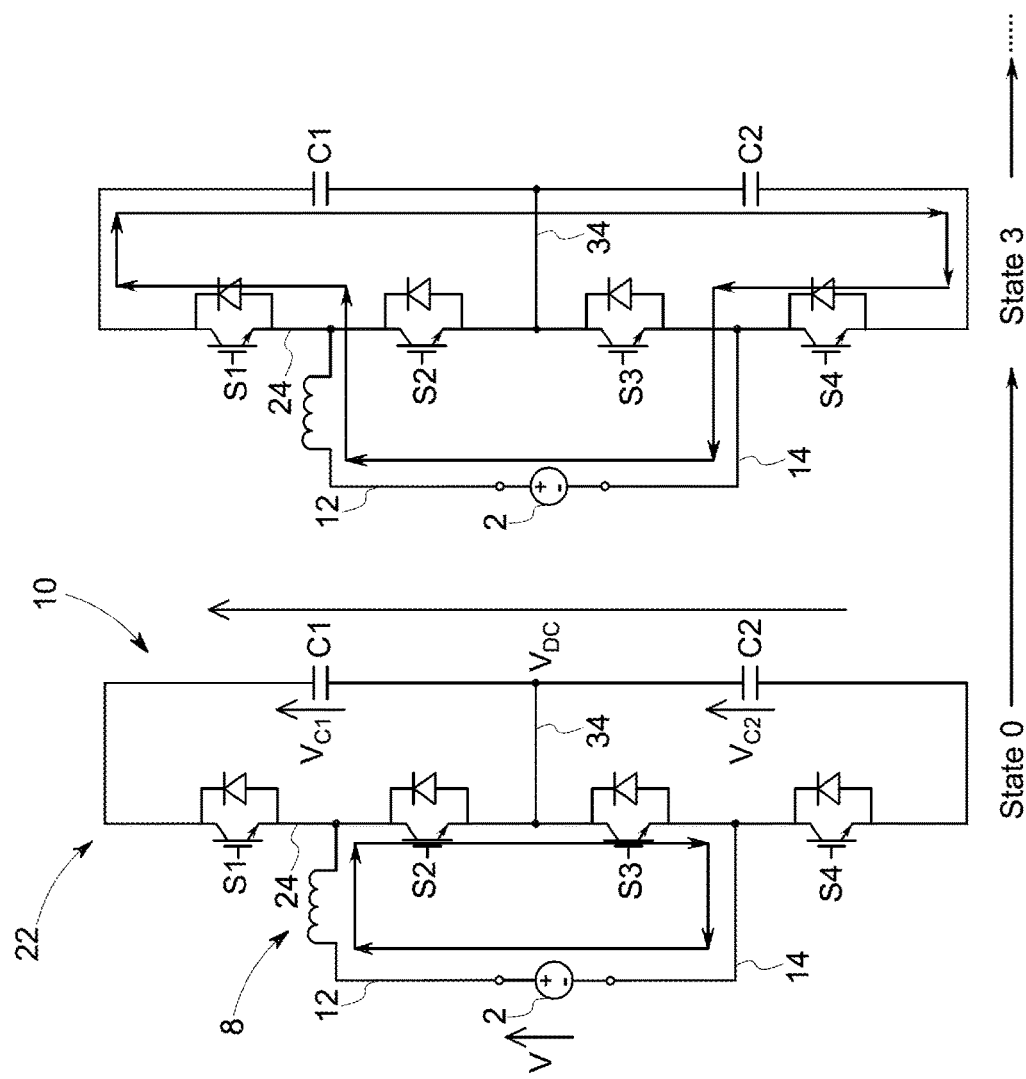
FIG. 4 is circuit diagrams showing switching states of a second switching sequence of the first DC/DC power converter of FIG. 1A in a voltage step-up mode.

FIG. 4 shows the voltage step-up reactor charging state and a voltage step-up reactor discharging state where the current loop includes both the first and second capacitors C1, C2 (or both DC link sections). In particular, the DC/DC power converter 8 can adopt the following states: the voltage step-up reactor charging state (State 0) described above, and a third voltage step-up reactor discharging state (State 3).

The second switches S2, S3 are switched by the controller to switch repeatedly the DC/DC power converter between the voltage step-up reactor charging state, the third voltage step-up reactor discharging state, the voltage step-up reactor charging state, the third voltage step-up reactor discharging state, and so on (e.g., 0, 3, 0, 3, . . . ) as a switching sequence. The current loop for each of the states is shown in FIG. 4 and the particular switching arrangement of the switches S1, S2, . . . S4 that the controller uses to derive each state can be summarised in Table 2 where * indicates that the associated freewheeling diode conducts when the controllable semiconductor switch is in the 'off' state:

TABLE 2

|  | S1 | S2 | S3 | S4 |
|---|---|---|---|---|
| State 0 | off | on | on | off |
| State 3 | off* | off | off | off* |

Corresponding waveforms for this switching sequence are not shown, but can easily be derived by the skilled person.

For the voltage step-up reactor discharging states utilised in the switching sequence of FIG. 4, N=2 and K=2. The DC link voltage derived during operation of the DC/DC power converter 8 when the switching sequence of FIG. 4 is applied by the controller 42 is given by:

$$V_{DC} = 2V_C = \frac{1500}{(1-0.6)}$$

Hence, for this particular switching sequence the capacitor voltage $V_C$ is 1875 VDC and the DC link voltage $V_{DC}$ is 3750 VDC.

During voltage step-up operation, the controller may switch between the switching sequences shown in FIGS. 2 and 4 as required, e.g., in accordance with the relationship between V and $V_C$. The controller 42 can switch between the switching sequences to regulate the capacitor voltage $V_C$ and the DC link voltage $V_{DC}$ according to operational requirements of the DC/DC power converter 8. It will be understood that switching between different switching sequences will change the DC link voltage. For example, switching from the switching sequence shown in FIG. 2 where K=1 to the switching sequence shown in FIG. 4 where K=2 will cause the DC link voltage to fall from 7500 VDC to 3750 VDC and might be carried out if the voltage provided by the DC power source/load is initially less than or equal to the capacitor voltage (i.e., $V \leq V_C$) but subsequently increases such that $V_C < V \leq 2V_C$.

Voltage Step-Down Mode, N=2

Figure 5:
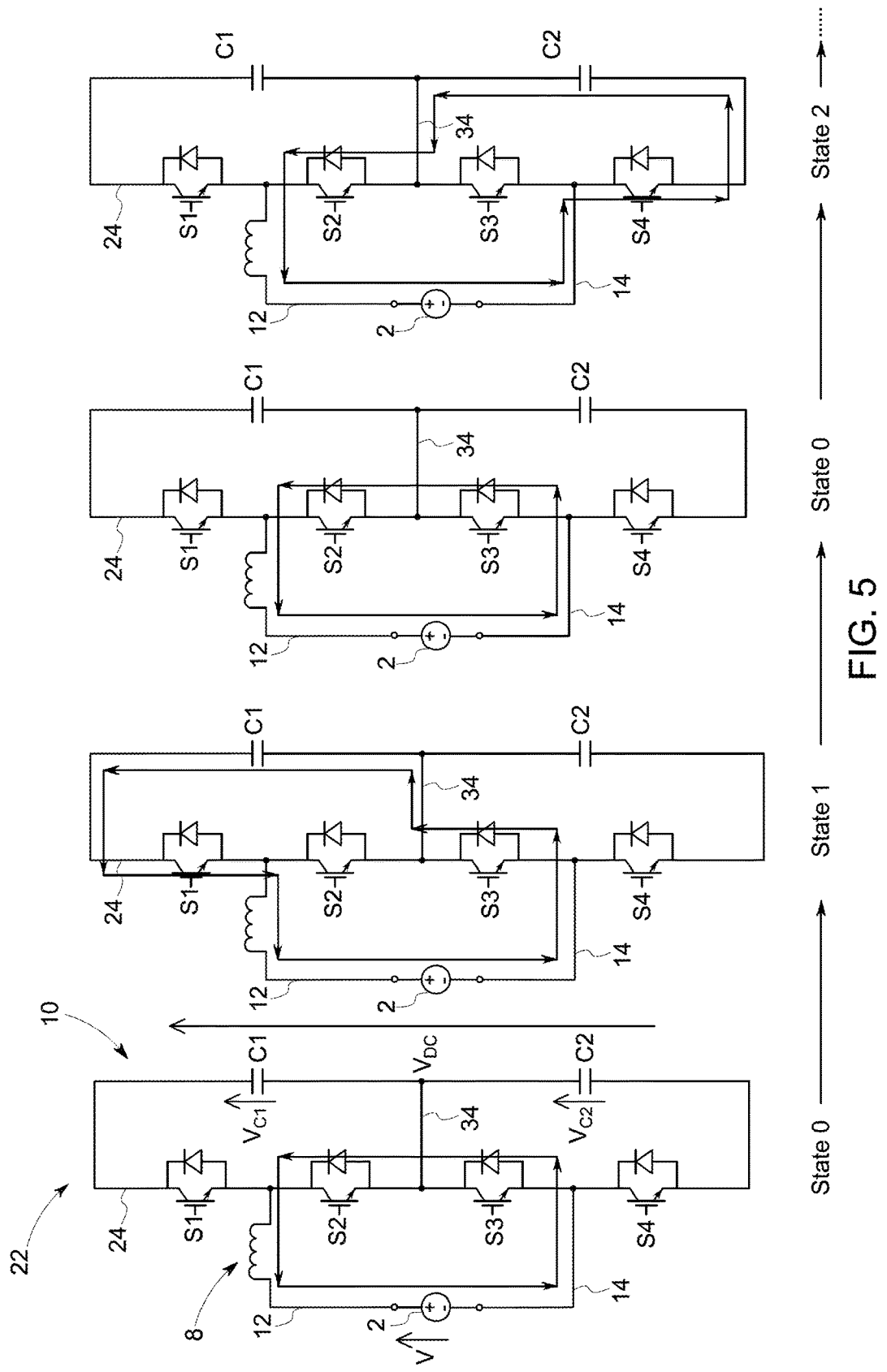
FIG. 5 is circuit diagrams showing switching states of a first switching sequence of the first DC/DC power converter of FIG. 1A in a voltage step-down mode.

FIG. 5 shows one voltage step-down reactor discharging state and two voltage step-down reactor charging states where the current loop includes only one of the capacitors C1, C2 (or DC link sections). In particular, the DC/DC power converter 8 can adopt the following states: a voltage step-down reactor discharging state (State 0), a first voltage step-down reactor charging state (State 1), and a second voltage step-down reactor charging state (State 2).

It will be readily appreciated that during a voltage step-down mode, the second switches S2, S3 are maintained in the 'off' state at all times. Only the first switches S1, S4 are switched by the controller to switch repeatedly the DC/DC power converter between the voltage step-down reactor discharging state, the first voltage step-down reactor charging state, the voltage step-down reactor discharging state, the second voltage step-down reactor charging state, the voltage step-down reactor discharging state, the first voltage step-down reactor charging state, the voltage step-down reactor discharging state, the second voltage step-down reactor charging state, and so on (e.g., 0, 1, 0, 2, 0, 1, 0, 2, . . . ) as a switching sequence. The current loop for each of the states is shown in FIG. 5 and the particular switching arrangement of the switches S1, S2, . . . S4 that the controller uses to derive each state can be summarised in Table 3 where * indicates that the associated freewheeling diode conducts when the controllable semiconductor switch is in the 'off' state:

TABLE 3

|  | S1 | S2 | S3 | S4 |
| --- | --- | --- | --- | --- |
| State 0 | off | off* | off* | off |
| State 1 | on | off | off* | off |
| State 2 | off | off* | off | on |

Figure 6:
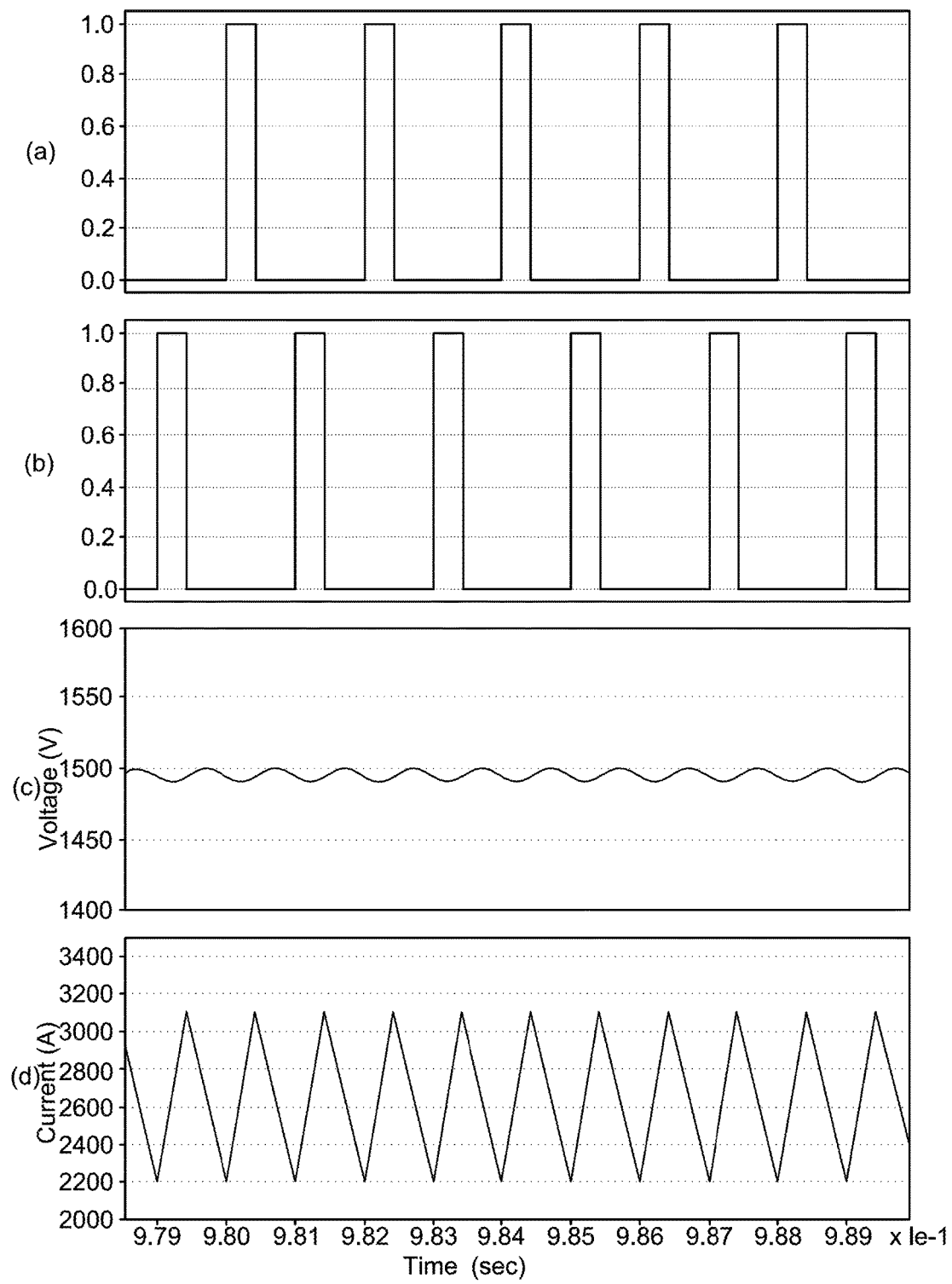
FIG. 6 is waveforms for the first switching sequence of FIG. 5.

FIG. 6 shows various waveforms for the switching sequence shown in FIG. 5. In particular, waveforms (a) and (b) show the switching patterns for the first switches S1 and S4, respectively, with respect to time, where a value of 1 indicates that the switch is in the 'on' state and a value of 0 indicates that the switch is in the 'off' state, waveform (c) shows the voltage V at the DC power source/load 2, and waveform (d) shows the reactor current with respect to time.

The DC/DC power converter is operated under the following conditions: the DC link voltage $V_{DC}$ is 7500 VDC, the duty ratio D is 0.4, the switching frequency is 500 Hz, the reactor inductance is 500 µH, the power in the DC link 10 is 4 MW, and the DC/DC power converter 8 is controlled such that the capacitor voltages $V_{C1}$ and $V_{C2}$ are substantially identical (i.e., $2V_C = V_{C1} + V_{C2}$.)

For the voltage step-down reactor charging states utilised in the switching sequence of FIG. 5, N=2 and K=1. The voltage at the DC power source/load 2 derived during operation of the DC/DC power converter 8 when the switching sequence of FIG. 5 is applied by the controller 42 is given by:

$$V = \left(\frac{1}{2}\right)(V_{DC} \cdot 0.4)$$

Hence, the voltage V is 1500 VDC.

Although not described here in detail, it will be understood that an alternative switching sequence of 0, 1, 0, 1, . . . or 0, 2, 0, 2, . . . could also be used if appropriate.

Figure 7:
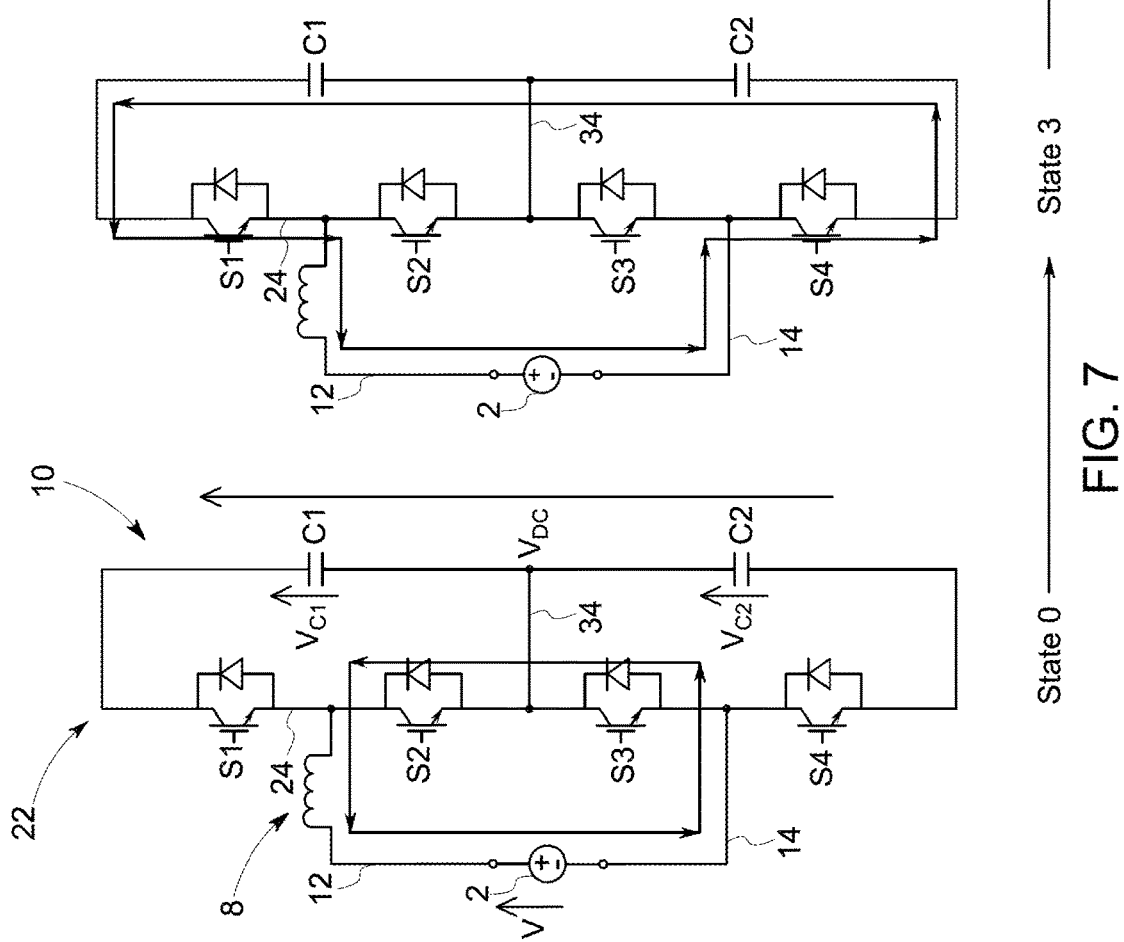
FIG. 7 is circuit diagrams showing switching states of a second switching sequence of the first DC/DC power converter of FIG. 1A in a voltage step-down mode.

FIG. 7 shows the voltage step-down reactor discharging state and a voltage step-down reactor discharging state where the current loop includes both of the capacitors C1, C2 (or both DC link sections). In particular, the DC/DC power converter can adopt the following states: the voltage step-down reactor discharging state (State 0) described above, and a third voltage step-down reactor charging state (State 3).

The first switches S1, S4 are switched by the controller to switch repeatedly the DC/DC power converter between the voltage step-down reactor discharging state, the third voltage step-down reactor charging state, the voltage step-down reactor discharging state, the third voltage step-down reactor charging state, and so on (e.g., 0, 3, 0, 3, . . . ) as a switching sequence. The current loop for each of the states is shown in FIG. 7 and the particular switching arrangement of the switches S1, S2, . . . S4 that the controller uses to derive each state can be summarised in Table 4 where * indicates that the associated freewheeling diode conducts when the controllable semiconductor switch is in the 'off' state:

TABLE 4

|  | S1 | S2 | S3 | S4 |
| --- | --- | --- | --- | --- |
| State 0 | off | off* | off* | off |
| State 3 | on | off | off | on |

Corresponding waveforms for this switching sequence are not shown, but can easily be derived by the skilled person.

For the voltage step-down reactor charging states utilised in the switching sequence of FIG. 7, N=2 and K=2. The voltage at the DC power source/load 2 derived during operation of the DC/DC power converter 8 when the switching sequence of FIG. 7 is applied by the controller 42 is given by:

$$V = (V_{DC} \cdot 0.4)$$

Hence, the voltage V is 3000 VDC.

During voltage step-down operation, the controller may switch between the switching sequences shown in FIGS. 5 and 7 as required, e.g., in accordance with the relationship between V and $V_C$.

DC/DC Power Converter with Parallel Converter Legs

Figure 8:
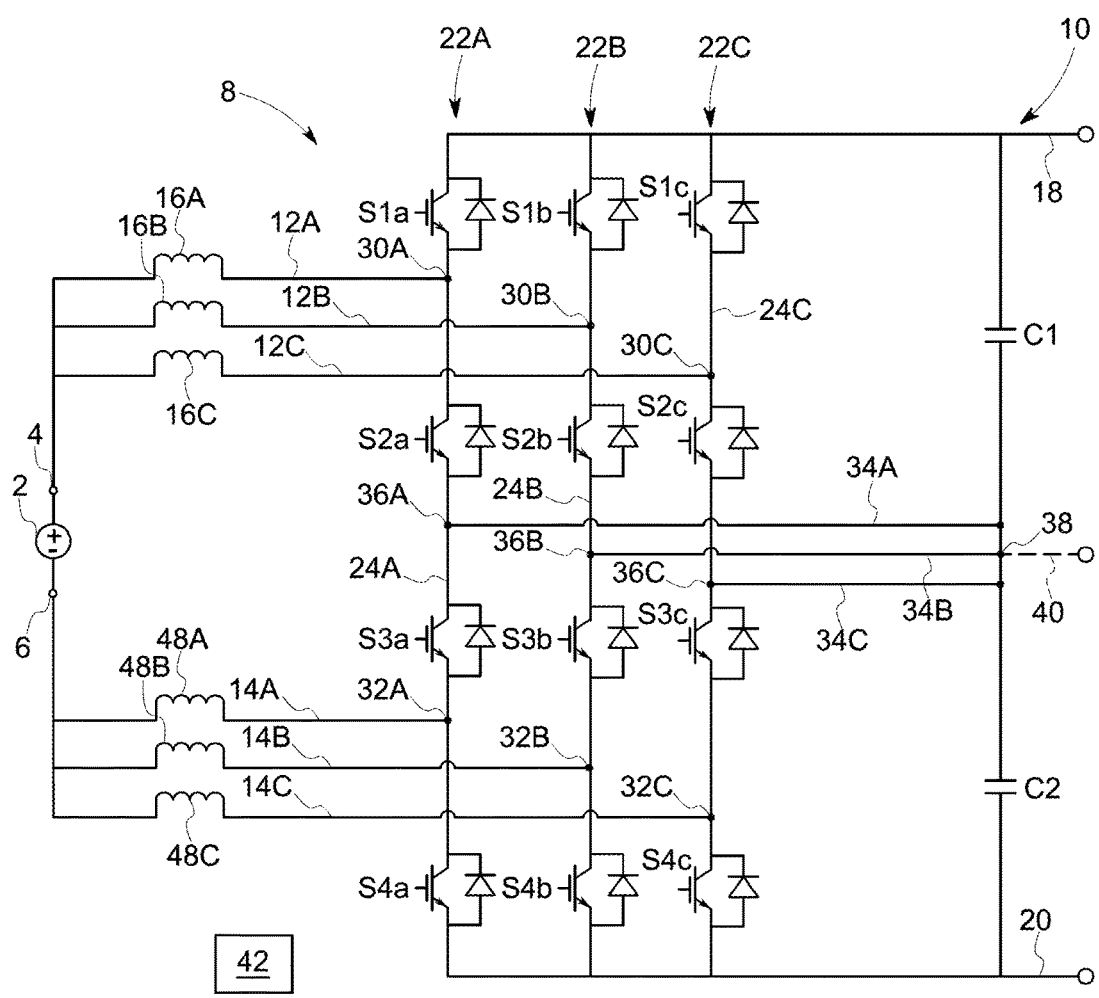
FIG. 8 is a circuit diagram showing a fourth DC/DC power converter with parallel converter legs.

FIG. 8 shows how Q converter legs can be connected in parallel between the third and fourth DC buses 18, 20 and the DC link 10, where Q≥2. In the DC/DC power converter 8 shown in FIG. 2, Q=3 such that the DC/DC converter includes a first converter leg 22A, a second converter leg 22B and a third converter leg 22B. Each converter leg 22A, 22B and 22C of the DC/DC power converter 8 includes a first (vertical) branch 24A, 24B and 24C and a second (horizontal) branch 34A, 34B and 34C having the arrangement shown in FIG. 1A. But each converter leg 22A, 22B and 22C could have the alternative arrangement shown in FIG. 1B or FIG. 1C if the DC/DC power converter is configured to operate only in a voltage step-up or step-down mode, respectively.

The first DC buses 12A, 12B and 12C of the converter legs are connected in parallel to the first DC terminal 4 of the DC power source/load 2. Each first DC bus 12A, 12B and 12C is connected to a respective junction 30A, 30B and 30C between the first and second switches S1a, S2a and S1b, S2b and S1c, S2c and includes a reactor 16A, 16B and 16C. The second DC buses 14A, 14B and 14C of the converter legs are connected in parallel to the second DC terminal 6 of the DC power source/load 2. Each second DC bus 14A, 14B and 14C is connected to a respective junction 32A, 32B and 32C between the first and second switches S4a, S3a and S4b, S3b and S4c, S3c. It will be understood that in the DC/DC power converter of FIG. 2, each second DC bus 14A, 14B and 14C also includes a reactor (or inductor) 48A, 48B and 48C. This can be implemented as a single reactor with two coupled windings for each leg or with six windings for all three legs. The junctions 36A, 36B and 36C between the first and second sections of each converter leg 22A, 22B and 22C are connected in parallel to the junction 38 between the capacitors C1, C2 by the second branches 34A, 34B and 34C of each converter leg. The controller can control the switching of the controllable semiconductor switches S1a, S2a, S4a, S1b, S2b, S4b and S1c, S2c, S4c within each converter leg 22A, 22B and 22C according to the same switching sequence, e.g., one of the switching sequences described above. But the switching can also be controlled such that the converter legs 22A, 22B and 22C are phase shifted with respect to each other to reduce ripple current.

Converter Modules

Figure 9:
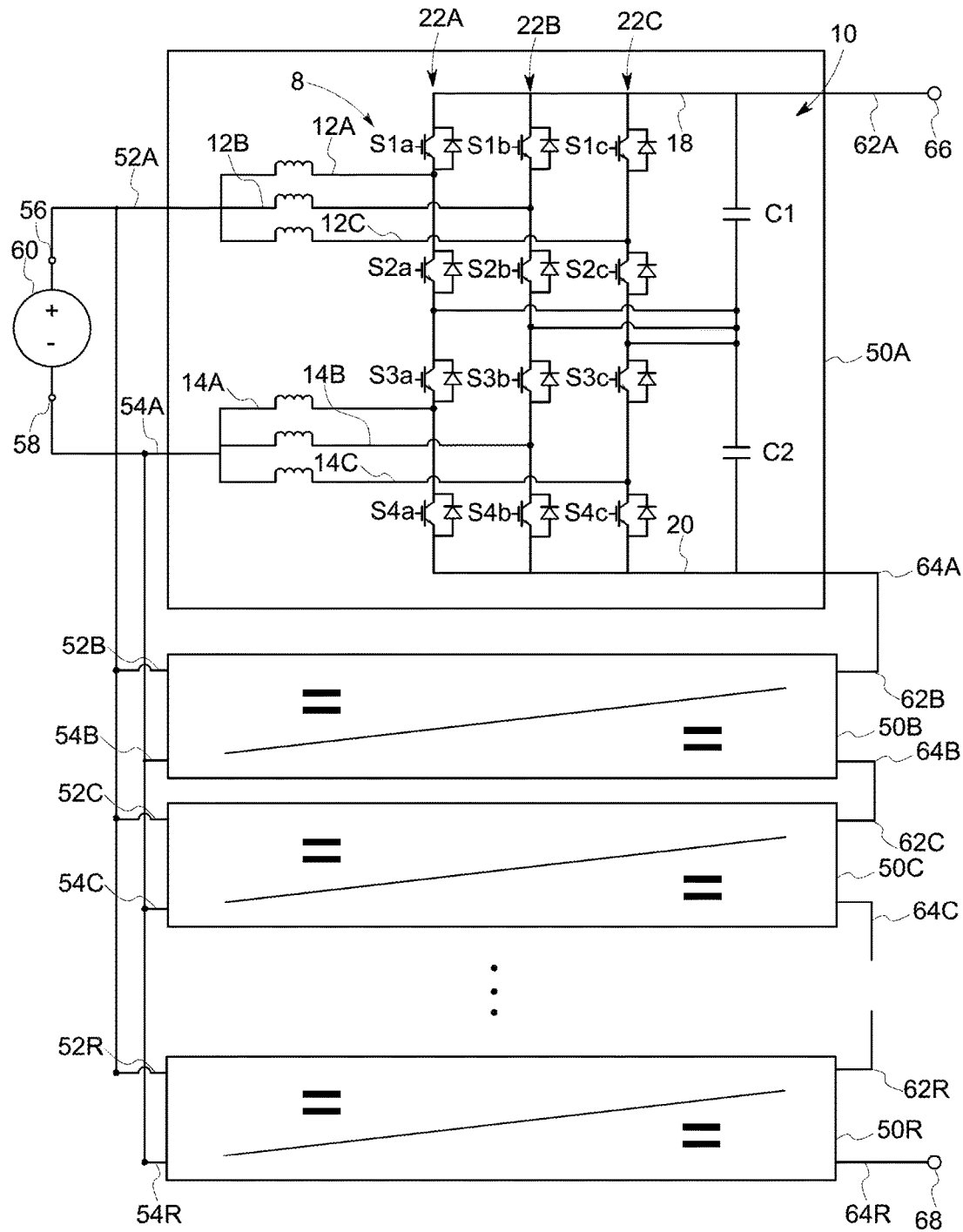
FIG. 9 is a circuit diagram of a converter module comprising a plurality of inter-connected DC/DC converter modules of FIG. 8.

FIG. 9 shows how R DC/DC power converters can be connected together as converter modules 50A, 50B, 50C, . . . 50R, where R≥2. The converter modules 50A, 50B, 50C, . . . 50R shown in FIG. 9 can have any suitable configuration. More particularly, although the DC/DC power converter 8 shown in FIG. 9 has a configuration where N=2 and Q=3 and is adapted for both voltage step-up and voltage step-down operation, in general it can have any suitable number of sections and converter legs. Each converter module 50A, 50B, 50C, . . . 50R can also be simplified for voltage step-up or voltage step-down operation as shown in FIGS. 1B and 1C.

The first DC buses 12A, 12B and 12C of each DC/DC power converter 8 are connected in parallel to define a first DC terminal 52 of the associated converter module, and the second DC buses 14A, 14B and 14C are connected in parallel to define a second DC terminal 54 of the associated converter module. The converter modules 50A, 50B, 50C . . . 50R are inter-connected in parallel on the LV side. In particular, the first DC terminals 52A, 52B, 52C, . . . 52R of the converter modules are connected in parallel to a first DC terminal 56 of a DC power source/load 60 and the second DC terminals 54A, 54B, 54C, . . . 54R of the converter modules are connected in parallel to a second DC terminal 58 of the DC power source/load. But it will be readily appreciated that the converter modules 50A, 50B, 50C . . . 50R could be inter-connected in other ways on the LV side.

The converter modules 50A, 50B, 50C . . . 50R are inter-connected in series on the MV side. In particular, the third DC bus 18 of each DC/DC power converter defines a third DC terminal 62A, 62B, 62C, . . . 62R of the associated converter module and the fourth DC bus 20 of each DC/DC power converter defines a fourth DC terminal 64A, 64B, 64C, . . . 64R of the associated converter module. The third DC terminal 62A of the first converter module 50A in the series defines a first main DC terminal 66. The fourth DC terminal 64R of the last converter module 50R in the series defines a second main DC terminal 68. The fourth DC terminal 64A, 64B, 64C, . . . 64(R−1) of each converter module apart from the last converter module 50R in the series, is connected to the third DC terminal 62B, 62C, . . . 62R of the next converter module in the series. For example, the fourth DC terminal 64A of the first converter module 50A is connected to the third DC terminal 62B of the second converter module 50B, the fourth DC terminal 64B of the second converter module 50B is connected to the third DC terminal 62C of the third converter module 50C, and so on. But it will be readily appreciated that the converter modules 50A, 50B, 50C, . . . 50R could be inter-connected in other ways on the MV side.

DC/DC Power Converter, N=3

Figure 10A:
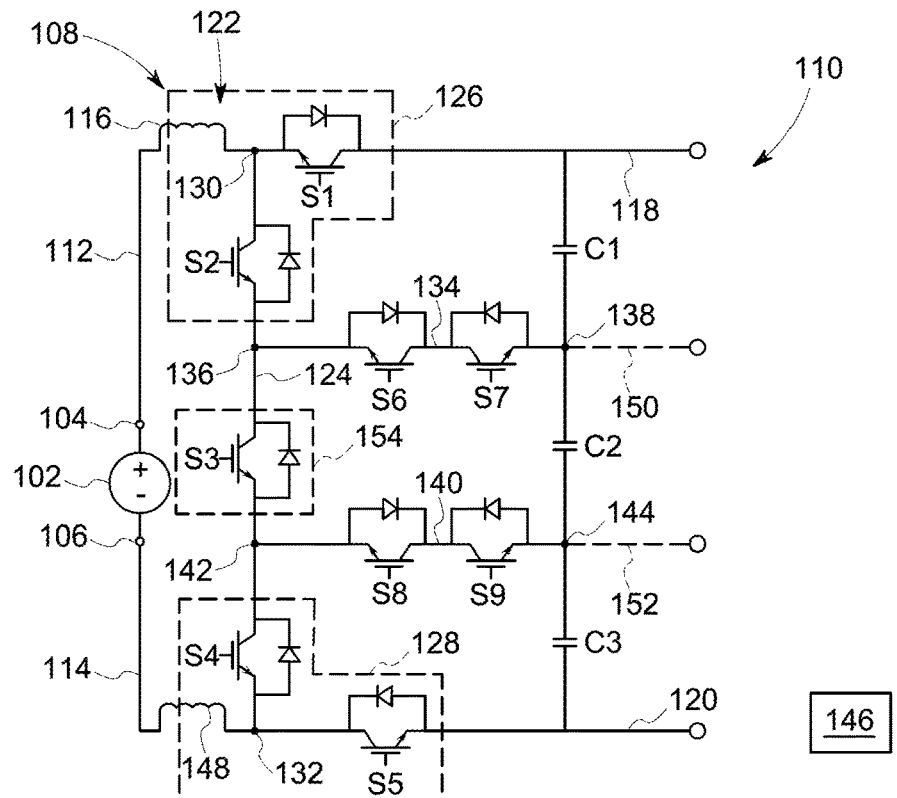
FIG. 10A is a circuit diagram of a fifth DC/DC power converter for voltage step-up/step-down operation, where N=3.

FIG. 10A shows a DC/DC power converter 108, where N=3. The DC/DC power converter 108 is connected to a DC power source/load 102 having a first DC terminal 104 and a second DC terminal 106. The DC power source/load 102 is an energy storage device that is capable of being charged and discharged, e.g., a battery, ultra-capacitor or supercapacitor. The DC/DC power converter 108 is configured to operate selectively in a voltage step-up mode (for discharging the DC power source/load 102 to a DC link 110) and a voltage step-down mode (for charging the DC power source/ load from the DC link).

The DC/DC power converter 108 includes a first DC bus 112 connected to the first DC terminal 104 of the DC power source/load 102, and a second DC bus 114 connected to the second DC terminal 106 of the DC power source/load. The first DC bus 112 includes a reactor (or inductor) 116 and the second DC bus 114 includes a reactor (or inductor) 148. The DC/DC power converter 108 also includes a third DC bus 118 and a fourth DC bus 120. The third and fourth DC buses 118, 120 define the DC link 110 of the DC/DC power converter 108.

The DC/DC power converter 108 includes three capacitors C1, C2 and C3 connected together in series between the third and fourth DC buses 118, 120. Each capacitor C1, C2 and C3 represents a DC link section. Although not shown, it will be readily appreciated that each DC link section can include two or more capacitors connected in series or parallel. The capacitors C1, C2 and C3 will, in an embodiment, have the same capacitance.

A converter leg 122 of the DC/DC power converter 108 includes a first (vertical) branch 124 with a first section 126, a second section 128 and a third (or intermediate) section 154 connected together in series between the third and fourth DC buses 118, 120 and in parallel with the series-connected capacitors C1, C2 and C3.

The first section 126 includes a first switch S1 and a second switch S2 connected by a first connecting node 130. The second section 128 includes a first switch S5 and a second switch S4 connected by a second connecting node 132. The third section 154 includes a switch S3. The first connecting node 130 is connected to the first DC bus 112 and the second connecting node 132 is connected to the second DC bus 114.

The converter leg 122 includes two second (horizontal) branches. For convenience, we refer below to a second branch 134 and a third branch 140 on the understanding that these represent (N−1) "second" branches as defined in the summary of the invention. The second branch 134 is connected between the junction 136 of the first and third sections 124, 154 and the junction 138 of the first and second capacitors C1, C2. The third branch 140 is connected between the junction 142 of the second and third sections 126, 154 and the junction 144 of the second and third capacitors C2, C3. The second branch 134 includes a first switch S6 and a second switch S7. The third branch 140 includes a first switch S8 and a second switch S9.

Each switch S1, S2, . . . S9 includes a controllable semiconductor switch (an IGBT is shown but other semiconductor switching devices could be used instead) and an anti-parallel connected freewheeling diode. The controllable switches of the switches S1, S2, . . . S5 in the first branch 124 are arranged with the same orientation. The controllable semiconductor switches of the first and second switches S6, S7 are arranged with reverse orientation. The controllable semiconductor switches of the first and second switches S8, S9 are also arranged with reverse orientation. Each switch has an 'on' state when the controllable semiconductor switch is in a conducting state and an 'off' state when the controllable semiconductor switch is in a non-conducting (or blocking) state. The controllable semiconductor switches are controlled in a conventional manner, e.g., by using a gate driver to apply a gate drive signal to the gate terminal of the controllable semiconductor switch). A controller 146 controls the gate drivers (not shown) to selectively control the switching of the controllable semiconductor switches between the conducting and non-conducting states.

The third and fourth DC buses 118, 120 can be connected to a DC power distribution system, a DC grid, an inverter, a DC load or DC power source (not shown), for example.

As described in more detail below, when the DC power source/load 102 is being discharged, the DC/DC power converter 108 will be operated in a voltage step-up mode to convert the low voltage (LV) input from the DC power source/load to a medium voltage (MV) output at the DC link 110. When the DC power source/load 102 is being charged, it is acting as a DC load and the DC/DC power converter 108 will be operated in a voltage step-down mode to convert the MV input from the DC link 110 to an LV output for the DC power source/load.

FIG. 10A also shows an optional fifth DC bus 150 connected to the junction 138 between the first and second capacitors C1, C2 if there is a requirement to provide two separate DC link voltages, i.e., a first DC link voltage between the third and fifth DC buses and a second DC link voltage between the fifth and fourth DC buses. FIG. 10A also shows an optional sixth DC bus 152 connected to the junction 144 between the second and third capacitors C2, C3 if there is a requirement to provide two separate DC link voltages, e.g., a first DC link voltage between the third and sixth DC buses and a second DC link voltage between the sixth and fourth DC buses. If the DC/DC power converter 108 includes both the fifth and sixth DC buses 150, 152 then three separate DC link voltages could be provided. The following description typically assumes that only one DC link voltage is provided between the third and fourth DC buses 118, 120.

Figure 10B:
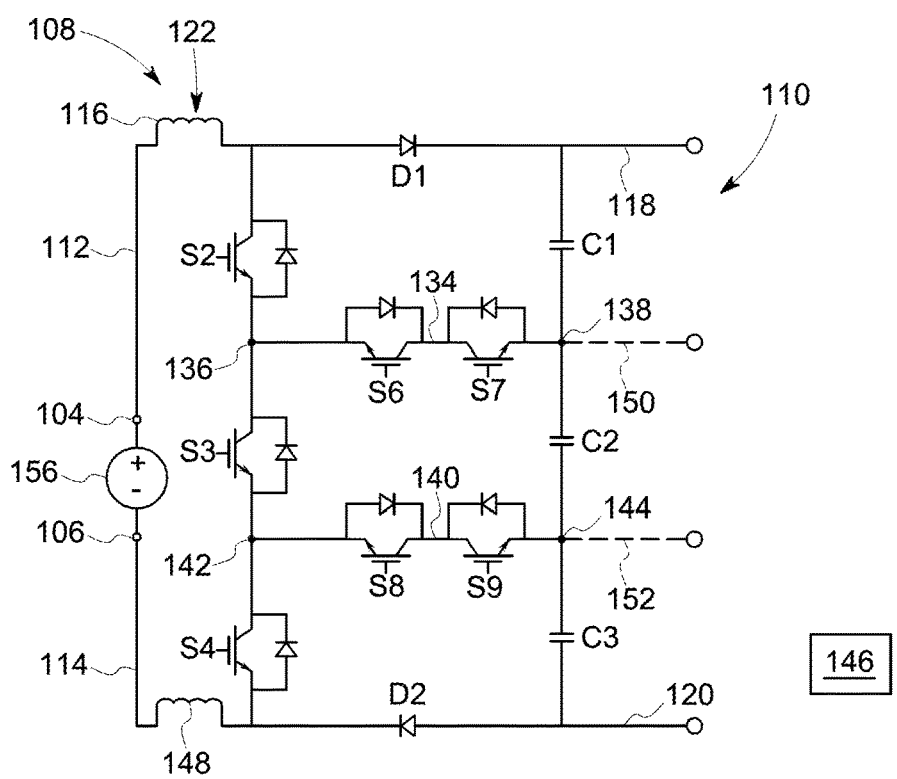
FIG. 10B is a circuit diagram of a sixth DC/DC power converter for voltage step-up operation, where N=3.

If the DC/DC power converter 108 is configured to operate only in a voltage step-up mode, the first switches S1 and S5 can be maintained permanently in the 'off' state or replaced with diodes D1 and D2 as shown in FIG. 10B. In this case, the DC/DC power converter 108 can be connected to a DC power source 156 that can be an energy generating device such as a fuel cell or a device that can extract energy from renewable sources like wind, wave or tidal flows, solar etc.

Figure 10C:
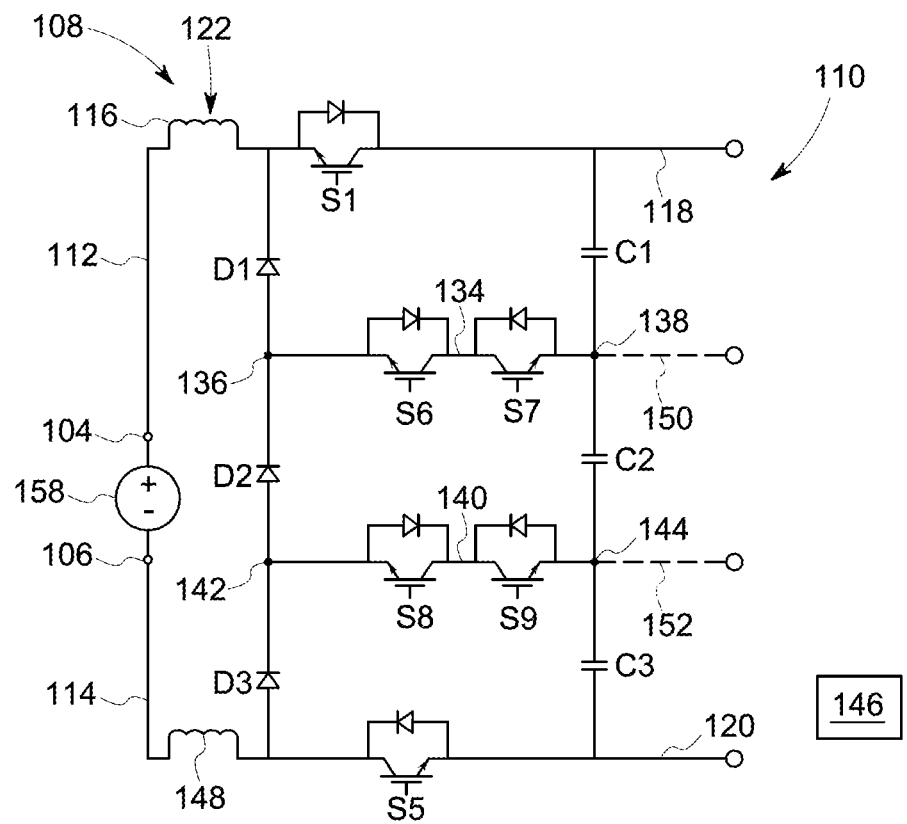
FIG. 10C is a circuit diagram of a seventh DC/DC power converter for voltage step-down operation, where N=3.

If the DC/DC power converter 108 is configured to operate only in a voltage step-down mode, the switches S2, S3 and S4 can be maintained permanently in the 'off' state of replaced with diodes D1, D2 and D3 as shown in FIG. 10C. In this case, the DC/DC power converter 108 can be connected to a DC load 158 such as a DC energy store, electronic equipment, an electrical machine such as a DC motor, or a variable speed drive comprising a voltage source inverter and an AC motor that is delivering power to a shaft coupling.

The operation of the DC/DC power converter shown in FIG. 10A will now be described for both voltage step-up and step-down modes.

Voltage Step-Up Mode, N=3

Figure 11A:
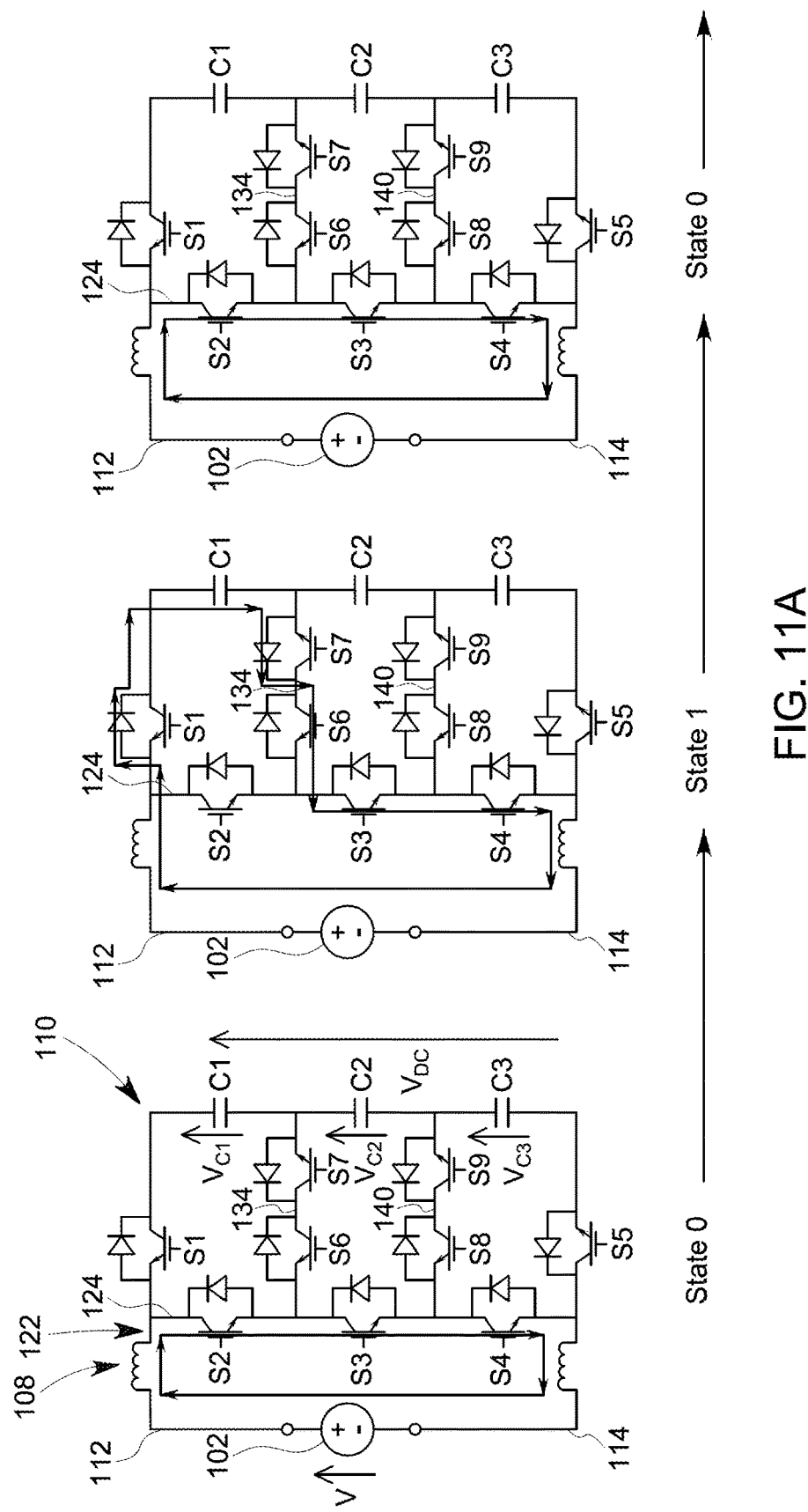
FIGS. 11A and 11B are circuit diagrams showing switching states of a first switching sequence of the fifth DC/DC power converter of FIG. 10A in a voltage step-up mode.
Figure 11B:
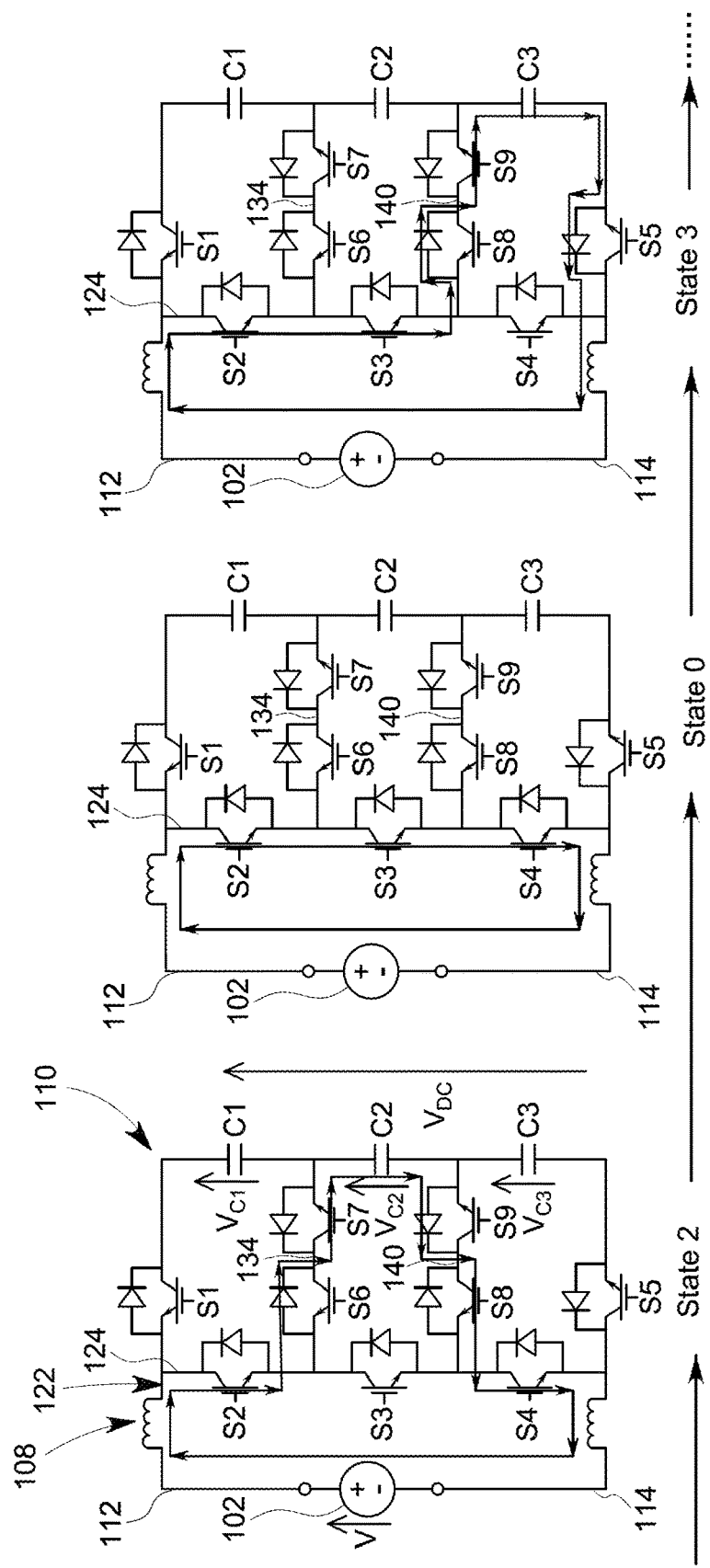

FIG. 11 shows one voltage step-up reactor charging state and three voltage step-up reactor discharging states where the current loop includes only one of the capacitors C1, C2 and C3 (or only one of the DC link sections). In particular, the DC/DC power converter 108 can adopt the following states: a voltage step-up reactor charging state (State 0), a first voltage step-up reactor discharging state (State 1), a second voltage step-up reactor discharging state (State 2), and a third voltage step-up reactor discharging state (State 3).

It will be readily appreciated that during a voltage step-up mode, the first switches S1, S5 are maintained in the 'off' state at all times. Only the switches S2, S3 and S4 in the first branch 124 and the switches S6, S7, ... S9 in the second and third branches 134, 140 are switched by the controller to switch repeatedly the DC/DC power converter between the voltage step-up reactor charging state, the first voltage step-up reactor discharging state, the voltage step-up reactor charging state, the second voltage step-up reactor discharging state, the voltage step-up reactor charging state, the third voltage step-up reactor discharging state, the voltage step-up reactor charging state, the first voltage step-up reactor discharging state, the voltage step-up reactor charging state, the second voltage step-up reactor discharging state, the voltage step-up reactor charging state, the third voltage step-up reactor discharging state, and so on (e.g., 0, 1, 0, 2, 0, 3, ...) as a switching sequence. The current loop for each of the states is shown in FIG. 11 and the particular switching arrangement of the switches S1, S2, ... S9 that the controller uses to derive each state can be summarised in Table 5 where * indicates that the associated freewheeling diode conducts and the controllable semiconductor switch is in the 'off' state:

TABLE 5

|         | S1   | S2  | S3  | S4  | S5   | S6   | S7   | S8   | S9   |
|---------|------|-----|-----|-----|------|------|------|------|------|
| State 0 | off  | on  | on  | on  | off  | off  | off  | off  | off  |
| State 1 | off* | off | on  | on  | off  | on   | off* | off  | off  |
| State 2 | off  | on  | off | on  | off  | off* | on   | on   | off* |
| State 3 | off  | on  | on  | off | off* | off  | off  | off* | on   |

Figure 12:
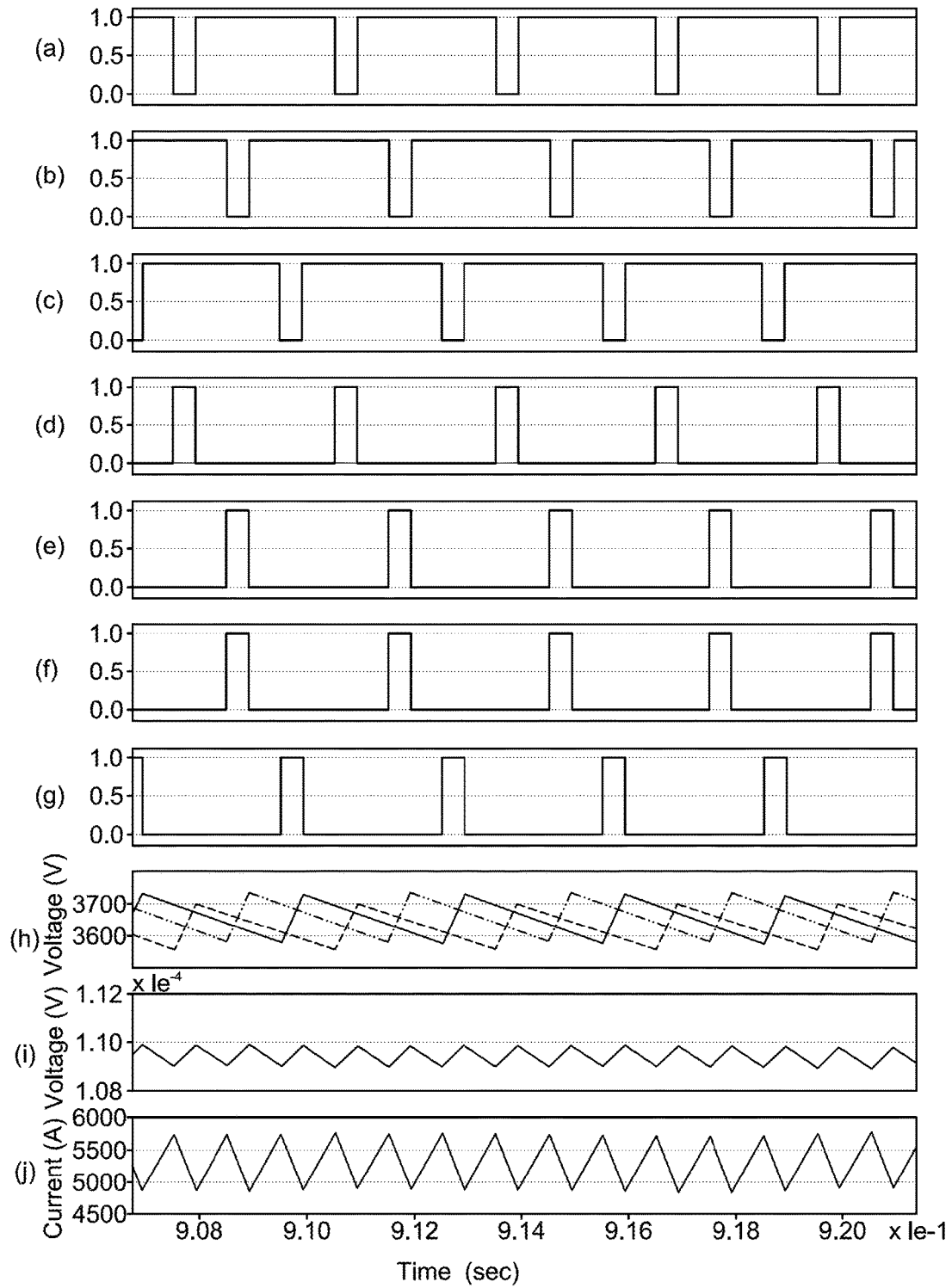
FIG. 12 is waveforms for the first switching sequence of FIGS. 11A and 11B.

FIG. 12 shows various waveforms for the switching sequence of FIG. 11. In particular, waveforms (a) to (c) show the switching patterns for the switches S2, S3 and S4 in the first branch, respectively, with respect to time, where a value of 1 indicates that the switch is in the 'on' state and a value of 0 indicates that the switch is in the 'off' state.

An embodiment provides waveforms (d) and (e) showing the switching patterns for the switches S6 and S7 in the second branch, respectively, with respect to time, where a value of 1 indicates that the switch is in the 'on' state and a value of 0 indicates that the switch is in the 'off' state, An embodiment provides waveforms (f) and (g) showing the switching patterns for the switches S8 and S9 in the third branch, respectively, with respect to time, where a value of 1 indicates that the switch is in the 'on' state and a value of 0 indicates that the switch is in the 'off 'state, An embodiment provides waveform (h) showing the capacitor voltages $V_{C1}$, $V_{C2}$ and $V_{C3}$ i.e., the voltage across the first capacitor C1 (dashed line), the voltage across the second capacitor C2 (solid line) and the voltage across the third capacitor C3 (chain link line) with respect to time, waveform (i) shows the DC link voltage $V_{DC}$ with respect to time, and waveform (j) shows the reactor current with respect to time.

The DC/DC power converter 108 is operated under the following conditions: the voltage V supplied by the DC power source/load 102 is 1500 VDC, the duty ratio D is 0.6, the switching frequency is 333 Hz, the reactor inductance is 500 μH, the power in the DC link 10 is 8 MW, and the DC/DC power converter 108 is controlled such that the capacitor voltages $V_{C1}$, $V_{C2}$ and $V_{C3}$ are substantially identical (i.e., $3V_C=V_{C1}V_{C2}V_{C3}$).

For the voltage step-up reactor discharging states utilised in the switching sequence of FIG. 11, N=3 and K=1. The DC link voltage derived during operation of the DC/DC power converter 108 when the switching sequence of FIG. 11 is applied by the controller 146 is given by:

$$V_{DC} = 3V_C = 3\frac{1500}{(1-0.6)}$$

Hence, for this particular switching sequence the capacitor voltage $V_C$ is 3750 VDC and the DC link voltage $V_{DC}$ is 11.25 kVDC.

Figure 13A:
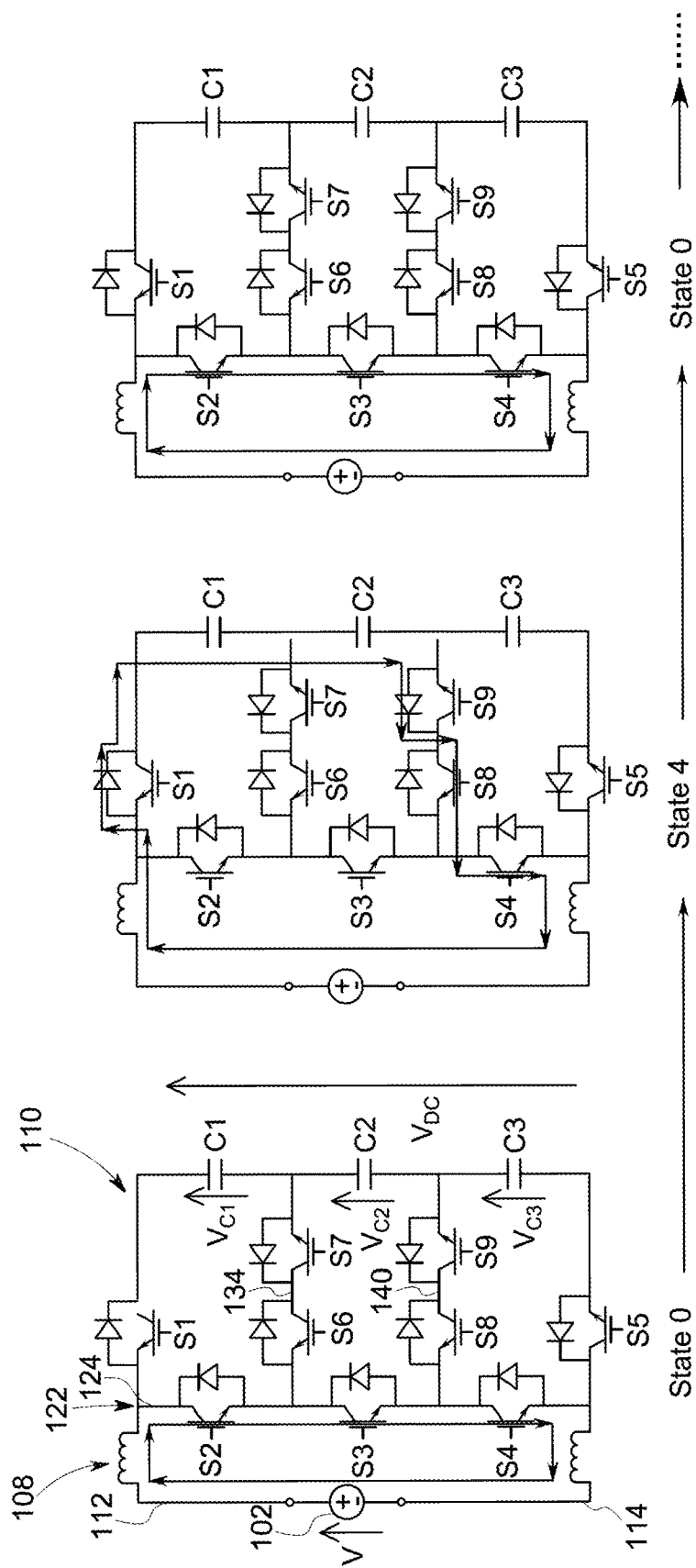
FIGS. 13A and 13B are circuit diagrams showing switching states of a second switching sequence of the fifth DC/DC power converter of FIG. 10A in a voltage step-up mode.
Figure 13B:
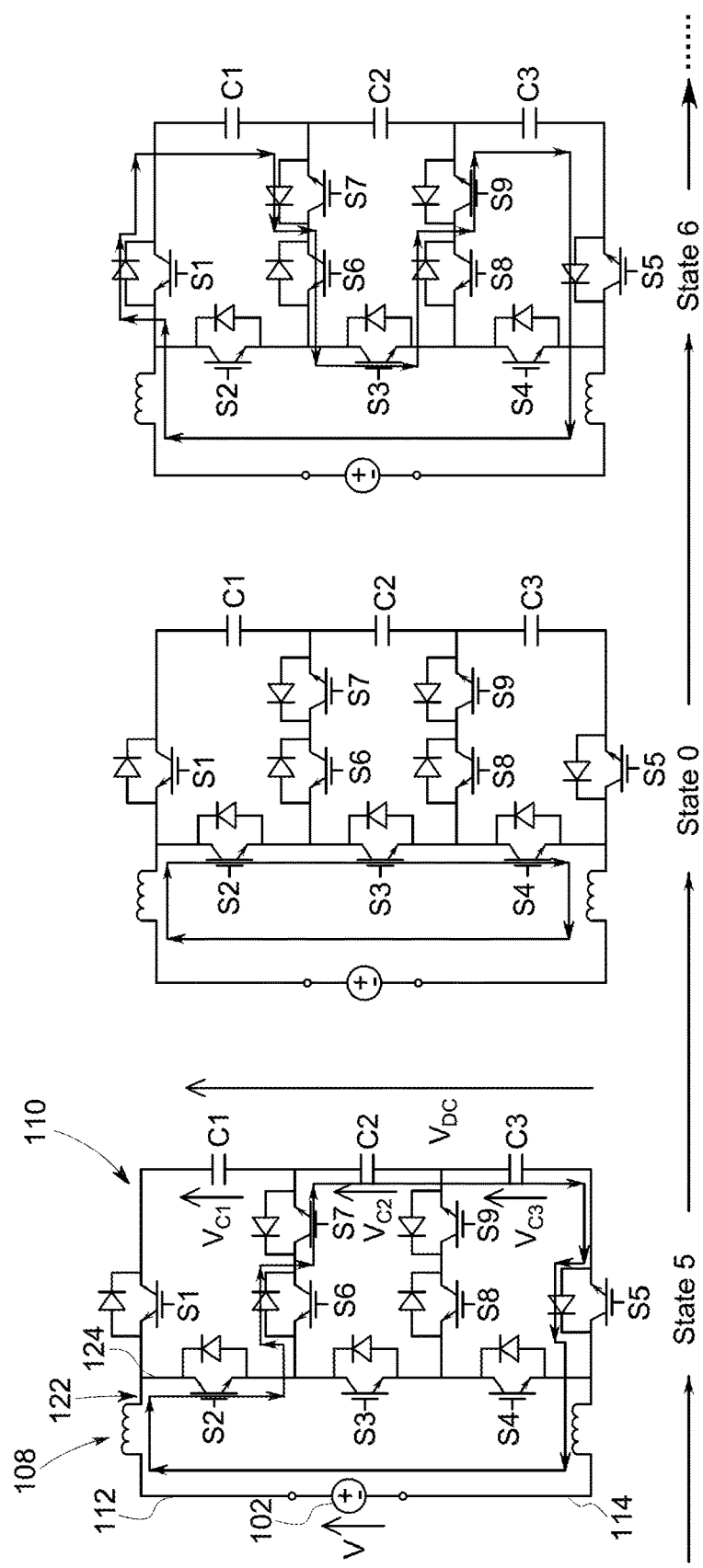

FIG. 13 shows the voltage step-up reactor charging state and two voltage step-up reactor discharging states where the current loop includes only two of the capacitors C1, C2 and C3 (or only two DC link sections). In particular, the DC/DC power converter 8 can adopt the following states: the voltage step-up reactor charging state (State 0) described above, a fourth voltage step-up reactor discharging state (State 4), a fifth voltage step-up reactor discharging state (State 5), and a sixth voltage step-up reactor discharging state (State 6).

The switches S2, S3 and S4 in the first branch 124 and the switches S6, S7, . . . S9 in the second and third branches 134, 140 are switched by the controller to switch repeatedly the DC/DC power converter between the voltage step-up reactor charging state, the fourth voltage step-up reactor discharging state, the voltage step-up reactor charging state, the fifth voltage step-up reactor discharging state, the voltage step-up reactor charging state, the fourth voltage step-up reactor discharging state, the voltage step-up reactor charging state, the fifth voltage step-up reactor discharging state, the voltage step-up reactor charging state, the sixth voltage step-up reactor discharging state, and so on (e.g., 0, 4, 0, 5, 0, 6, . . . ) as a switching sequence. The current loop for each of the states is shown in FIG. 13 and the particular switching arrangement of the switches S1, S2, . . . S9 that the controller uses to derive each state can be summarised in Table 6 where * indicates that the associated freewheeling diode conducts when the controllable semiconductor switch is in the 'off' state:

TABLE 6

| | S1 | S2 | S3 | S4 | S5 | S6 | S7 | S8 | S9 |
|---|---|---|---|---|---|---|---|---|---|
| State 0 | off | on | on | on | off | off | off | off | off |
| State 4 | off* | off | off | on | off | off | off | on | off* |
| State 5 | off | on | off | off | off* | off* | on | off | off |
| State 6 | off* | off | on | off | off* | on | off* | off* | on |

Corresponding waveforms for this switching sequence are not shown, but can easily be derived by the skilled person.

For the voltage step-up reactor discharging states utilised in the switching sequence of FIG. 13, N=3 and K=2. The DC link voltage derived during operation of the DC/DC power converter 108 when the switching sequence of FIG. 13 is applied by the controller 146 is given by:

$$V_{DC} = 3V_C = \left(\frac{3}{2}\right)\frac{1500}{(1-0.6)}$$

Hence, for this particular switching sequence the capacitor voltage $V_C$ is 1874 VDC and the DC link voltage $V_{DC}$ is 5625 VDC.

Figure 14:
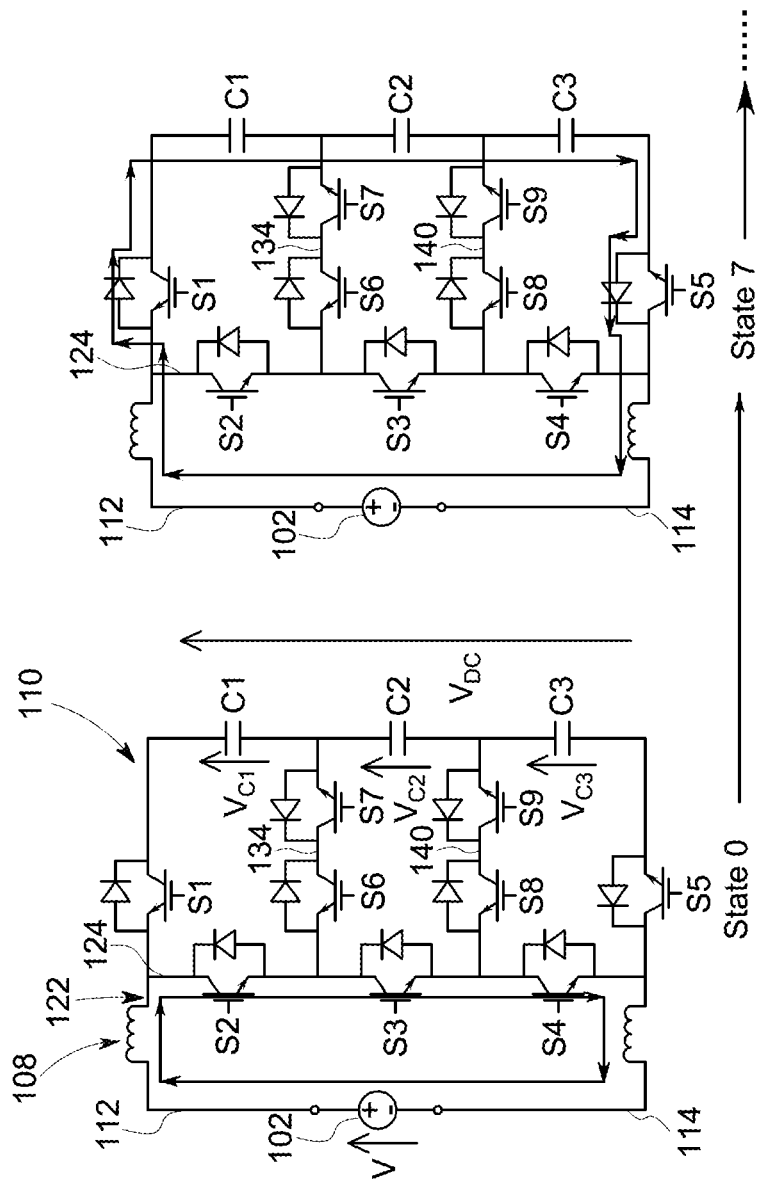
FIG. 14 is circuit diagrams showing switching states of a third switching sequence of the fifth DC/DC power converter of FIG. 10A in a voltage step-up mode.

FIG. 14 shows the voltage step-up reactor charging state and a voltage step-up reactor discharging state where the current loop includes all three capacitors C1, C2 and C3 (or all three DC link sections). In particular, the DC/DC power converter 108 can adopt the following states: the voltage step-up reactor charging state (State 0) described above, and a seventh voltage step-up reactor discharging state (State 7).

The switches S2, S3 and S4 in the first branch 124 and the switches S6, S7, . . . S9 in the second and third branches 134, 140 are switched by the controller to switch repeatedly the DC/DC power converter between the voltage step-up reactor charging state, the seventh voltage step-up reactor discharging state, the voltage step-up reactor charging state, the seventh voltage step-up reactor discharging state, and so on (e.g., 0, 7, 0, 7, . . . ) as a switching sequence. The current loop for each of the states is shown in FIG. 14 and the particular switching arrangement of the switches S1, S2, . . . S9 that the controller uses to derive each state can be summarised in Table 7 where * indicates that the associated freewheeling diode conducts when the controllable semiconductor switch is in the 'off' state:

TABLE 7

| | S1 | S2 | S3 | S4 | S5 | S6 | S7 | S8 | S9 |
|---|---|---|---|---|---|---|---|---|---|
| State 0 | off | on | On | On | off | off | off | off | off |
| State 7 | off* | off | Off | On | off | off | off | on | off* |

Corresponding waveforms for this switching sequence are not shown, but can easily be derived by the skilled person.

For the voltage step-up reactor discharging states utilised in the switching sequence of FIG. 14, N=3 and K=3. The DC link voltage derived during operation of the DC/DC power converter 108 when the switching sequence of FIG. 14 is applied by the controller 146 is given by:

$$V_{DC} = 3V_C = \frac{1500}{(1-0.6)}$$

Hence, for this particular switching sequence the capacitor voltage $V_C$ is 1250 VDC and the DC link voltage $V_{DC}$ is 3750 VDC.

During voltage step-up operation, the controller may switch between the switching sequences shown in FIGS. 11, 13 and 14 as required, e.g., in accordance with the relationship between V and $V_C$.

In the above examples, the voltage V supplied by the DC power source/load 102 is 1500 VDC and the DC link voltage varies. But assuming that the DC link voltage is maintained substantially constant, if the voltage V supplied by the DC power source/load 102 is less than or equal to one third of the DC link voltage (i.e., $V \leq V_{DC}/3$) then K=1 and the DC/DC power converter 108 is operated according to a suitable switching sequence, e.g., the switching sequence shown in FIG. 11. If the voltage V supplied by the DC power source/load 102 is greater than one third of the DC link voltage but less than or equal to two thirds of the DC link voltage (i.e., $V_{DC}/3 < V \leq 2V_{DC}/3$) then K=2 and the DC/DC power converter 108 is operated according to a suitable switching sequence, e.g., the switching sequence shown in FIG. 13. Finally, if the voltage V supplied by the DC power source/load is greater than two thirds of the DC link voltage but less than or equal to the DC link voltage (i.e., $V_{DC}/3 < V \leq 2V_{DC}/3$) then K=3 and the DC/DC power converter 108 is operated according to a suitable switching sequence, e.g., the switching sequence shown in FIG. 14.

The switching sequences highlighted above utilise all of the available DC link sections over the course of switching cycle for K=1, 2 and 3. Other switching sequences that the controller can also use as appropriate include: 0, 1, 0, 2, 0, 1, 0, 2, . . . , 0, 2, 0, 3, 0, 2, 0, 3, . . . , 0, 1, 0, 3, 0, 1, 0, 3, . . . , 0, 1, 0, 1, . . . , 0, 2, 0, 2, . . . , 0, 3, 0, 3, . . . , 0, 4, 0, 5, 0, 4, 0, 5, . . . , 0, 5, 0, 6, 0, 5, 0, 6, . . . , 0, 4, 0, 6, 0, 4, 0, 6, . . . , 0, 4, 0, 4, . . . , 0, 5, 0, 5, . . . , 0, 6, 0, 6, . . . , for example.

Voltage Step-Down Mode, N=3

Figure 15A:
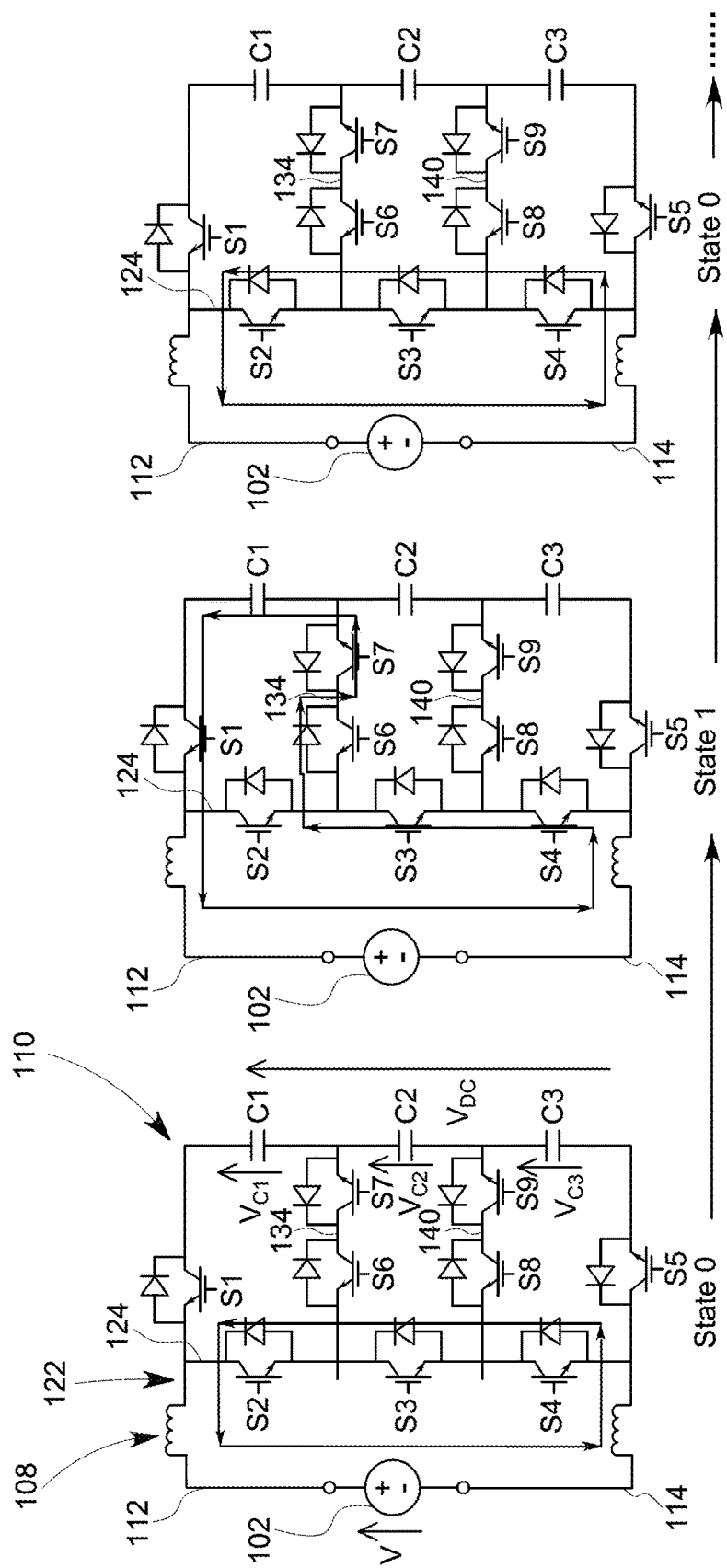
FIGS. 15A and 15B are circuit diagrams showing switching states of a first switching sequence of the fifth DC/DC power converter of FIG. 10A in a voltage step-down mode.
Figure 15B:
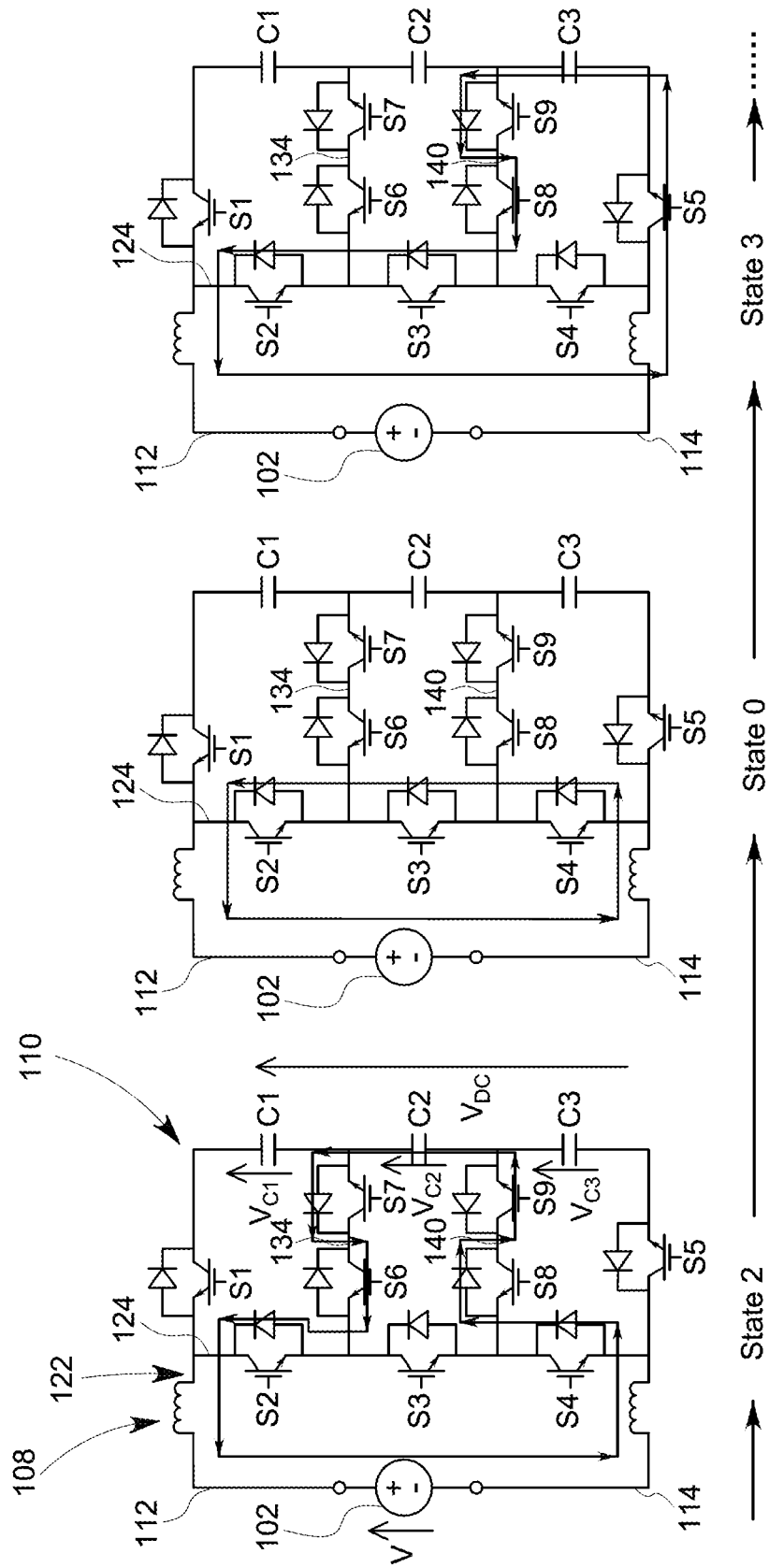

FIG. 15 shows one voltage step-down reactor discharging state and three voltage step-down reactor charging states where the current loop includes only one of the capacitors C1, C2 and C3 (or only one of the DC link sections). In particular, the DC/DC power converter 108 can adopt the following states: a voltage step-up reactor discharging state (State 0), a first voltage step-up reactor charging state (State 1), a second voltage step-up reactor charging state (State 2), and a third voltage step-up reactor charging state (State 3).

It will be readily appreciated that during a voltage step-down mode, the switches S2, S3 and S4 in the first branch 124 are maintained in the 'off' state at all times. Only the first switches S1, S5 and the switches S6, S7, . . . S9 in the second and third branches 134, 140 are switched by the controller to switch repeatedly the DC/DC power converter between the voltage step-down reactor discharging state, the first voltage step-down reactor charging state, the voltage step-down reactor discharging state, the second voltage step-down reactor charging state, the voltage step-down reactor discharging state, the third voltage step-down reactor charging state, the voltage step-down reactor discharging state, the first voltage step-down reactor charging state, the voltage step-down reactor discharging state, the second voltage step-down reactor charging state, the voltage step-down reactor discharging state, the third voltage step-down reactor charging state, and so on (e.g., 0, 1, 0, 2, 0, 3, . . . ) as a switching sequence. The current loop for each of the states is shown in FIG. 15 and the particular switching arrangement of the switches S1, S2, . . . S9 that the controller uses to derive each state can be summarised in Table 8 where * indicates that the associated freewheeling diode conducts when the controllable semiconductor switch is in the 'off' state:

TABLE 8

| | S1 | S2 | S3 | S4 | S5 | S6 | S7 | S8 | S9 |
|---|---|---|---|---|---|---|---|---|---|
| State 0 | Off | off | off* | off* | off | off | off | off | off |
| State 1 | On | off | off* | off* | off | off* | on | off | off |
| State 2 | Off | off* | Off | off* | off | on | off* | off* | on |
| State 3 | Off | off* | off* | Off | on | off | off | on | off* |

Figure 16:
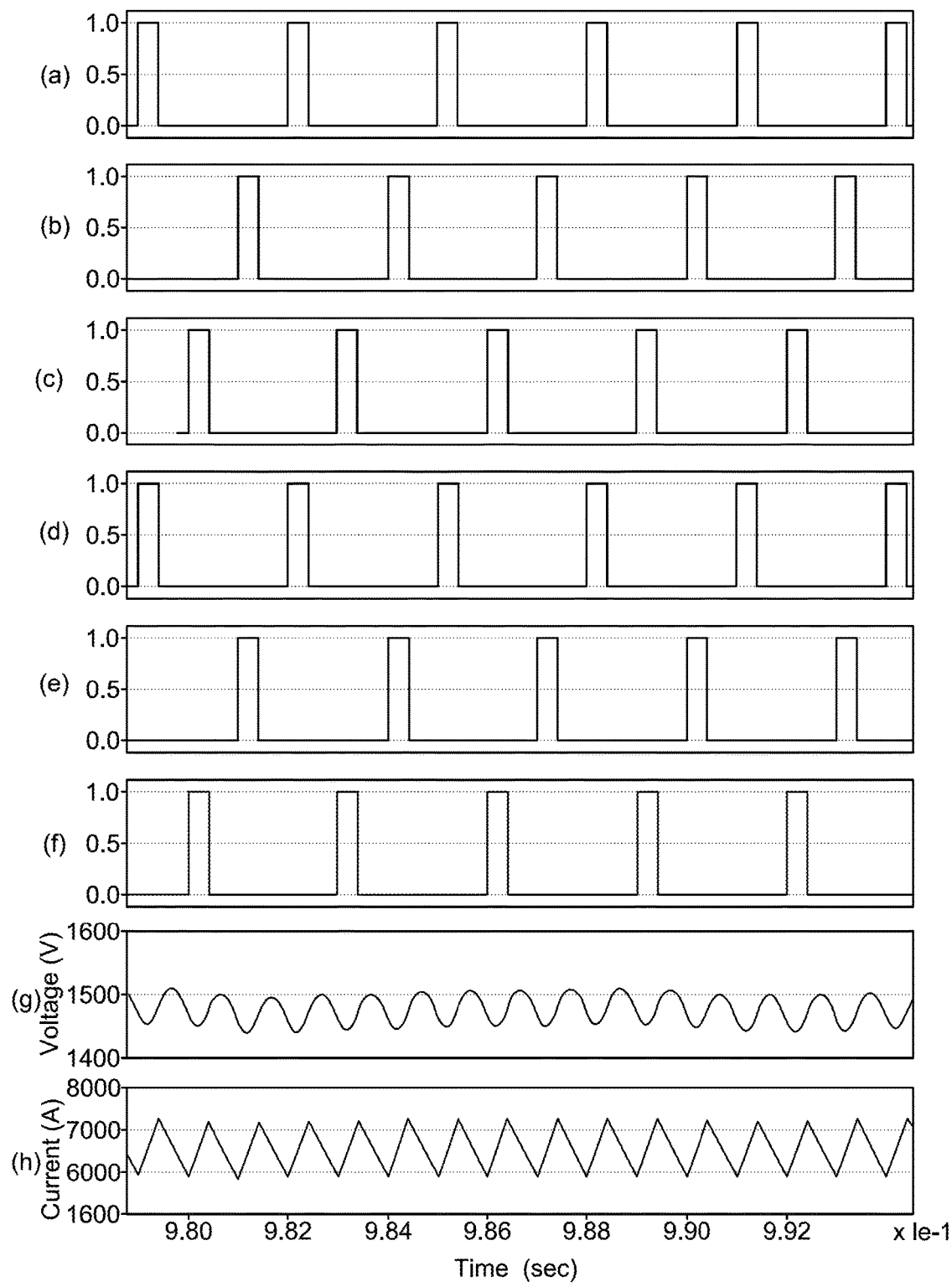
FIG. 16 is waveforms for the first switching sequence of FIGS. 15A and 15B.

FIG. 16 shows various waveforms for the switching sequence of FIG. 15. In particular, waveforms (a) and (b) show the switching patterns for the first switches S1 and S5, respectively, with respect to time, where a value of 1 indicates that the switch is in the 'on' state and a value of 0 indicates that the switch is in the 'off' state, waveforms (c) and (d) show the switching patterns for the switches S6 and S7 in the second branch, respectively, with respect to time, where a value of 1 indicates that the switch is in the 'on' state and a value of 0 indicates that the switch is in the 'off' state, waveforms (e) and (f) show the switching patterns for the switches S8 and S9 in the third branch, respectively, with respect to time, where a value of 1 indicates that the switch is in the 'on' state and a value of 0 indicates that the switch is in the 'off' state, waveform (g) shows the voltage V at the DC power source/load 102, and waveform (h) shows the reactor current with respect to time.

The DC/DC power converter is operated under the following conditions:

the DC link voltage $V_{DC}$ is 11 kVDC, the duty ratio D is 0.4, the switching frequency is 333 Hz, the reactor inductance is 500 μH, the power in the DC link 110 is 8 MW, and the DC/DC power converter 108 is controlled such that the capacitor voltages $V_{C1}$, $V_{C2}$ and $V_{C3}$ are substantially identical (i.e., $3V_C = V_{C1} + V_{C2} V_{C3}$)

For the voltage step-down reactor charging states utilised in the switching sequence of FIG. 15, N=3 and K=1. The voltage at the DC power source/load 102 derived during operation of the DC/DC power converter 108 when the switching sequence of FIG. 15 is applied by the controller 146 is given by:

$$V = \left(\frac{1}{3}\right)(V_{DC} \cdot 0.4)$$

Hence, the voltage V is 1467 VDC.

Figure 17A:
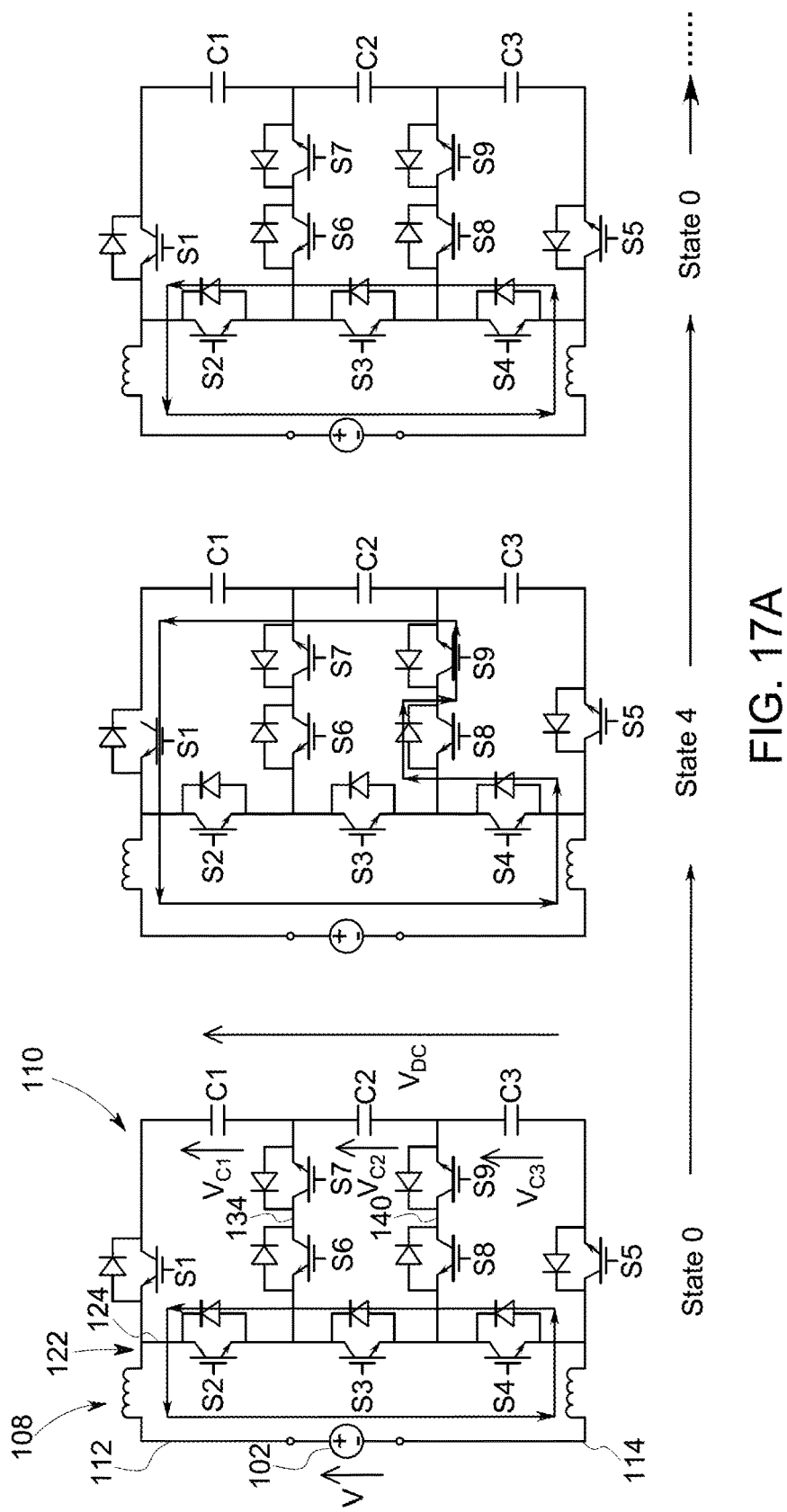
FIGS. 17A and 17B are circuit diagrams showing switching states of a second switching sequence of the fifth DC/DC power converter of FIG. 10A in a voltage step-down mode.
Figure 17B:
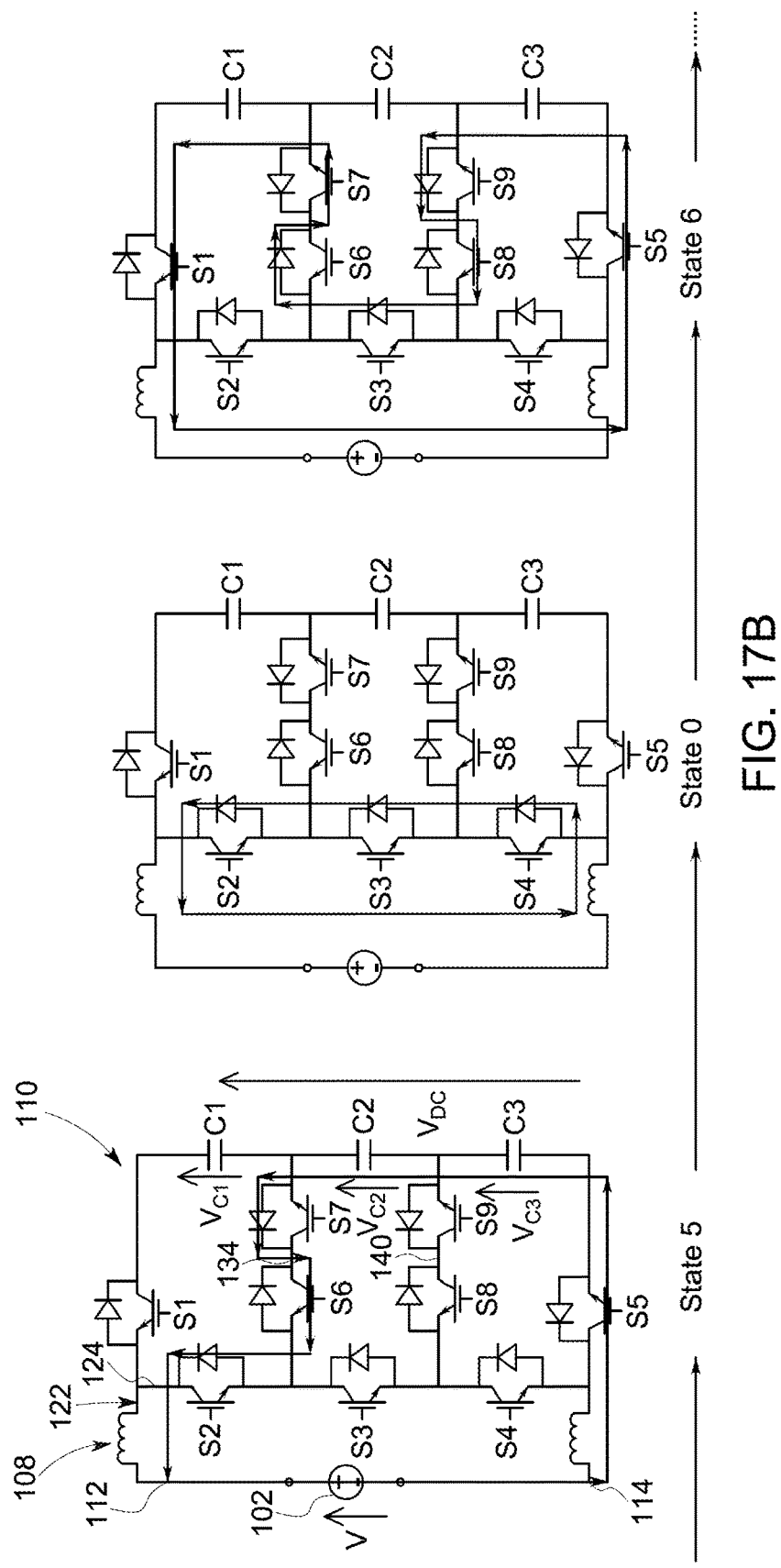

FIG. 17 shows the voltage step-down reactor discharging state and two voltage step-down reactor discharging states where the current loop includes only two of the capacitors C1, C2 and C3 (or only two of the DC link sections). In particular, the DC/DC power converter 8 can adopt the following states: the voltage step-down reactor discharging state (State 0) described above, a fourth voltage step-down reactor charging state (State 4), a fifth voltage step-down reactor charging state (State 5), and a sixth voltage step-down reactor charging state (State 6).

The first switches S1, S5 and the switches S6, S7, . . . S9 in the second and third branches 134, 140 are switched by the controller to switch repeatedly the DC/DC power converter between the voltage step-down reactor discharging state, the fourth voltage step-down reactor charging state, the voltage step-down reactor discharging state, the fifth voltage step-down reactor charging state, the voltage step-down reactor discharging state, the fourth voltage step-down reactor charging state, the voltage step-down reactor discharging state, the fifth voltage step-down reactor charging state, the voltage step-down reactor discharging state, the sixth voltage step-down reactor charging state, and so on (e.g., 0, 4, 0, 5, 0, 6, . . . ) as a switching sequence. The current loop for each of the states is shown in FIG. 17 and the particular switching arrangement of the switches S1, S2, . . . S9 that the controller uses to derive each state can be summarised in Table 9 where * indicates that the associated freewheeling diode conducts when the controllable semiconductor switch is in the 'off' state:

TABLE 9

| | S1 | S2 | S3 | S4 | S5 | S6 | S7 | S8 | S9 |
|---|---|---|---|---|---|---|---|---|---|
| State 0 | Off | off* | off* | off* | off | off | off | off | off |
| State 4 | On | off | off | off* | off | off | off | off* | on |

TABLE 9-continued

|  | S1 | S2 | S3 | S4 | S5 | S6 | S7 | S8 | S9 |
|---|---|---|---|---|---|---|---|---|---|
| State 5 | Off | off* | off | Off | on | on | off* | off | off |
| State 6 | On | off | off* | Off | on | off* | on | on | off* |

Corresponding waveforms for this switching sequence are not shown, but can easily be derived by the skilled person.

For the voltage step-down reactor charging states utilised in the switching sequence of FIG. 17, N=3 and K=2. The voltage at the DC power source/load 102 derived during operation of the DC/DC power converter 108 when the switching sequence of FIG. 17 is applied by the controller 146 is given by:

$$V = \left(\frac{2}{3}\right)(V_{DC} \cdot 0.4)$$

Hence, the voltage V is 2933 VDC.

Figure 18:
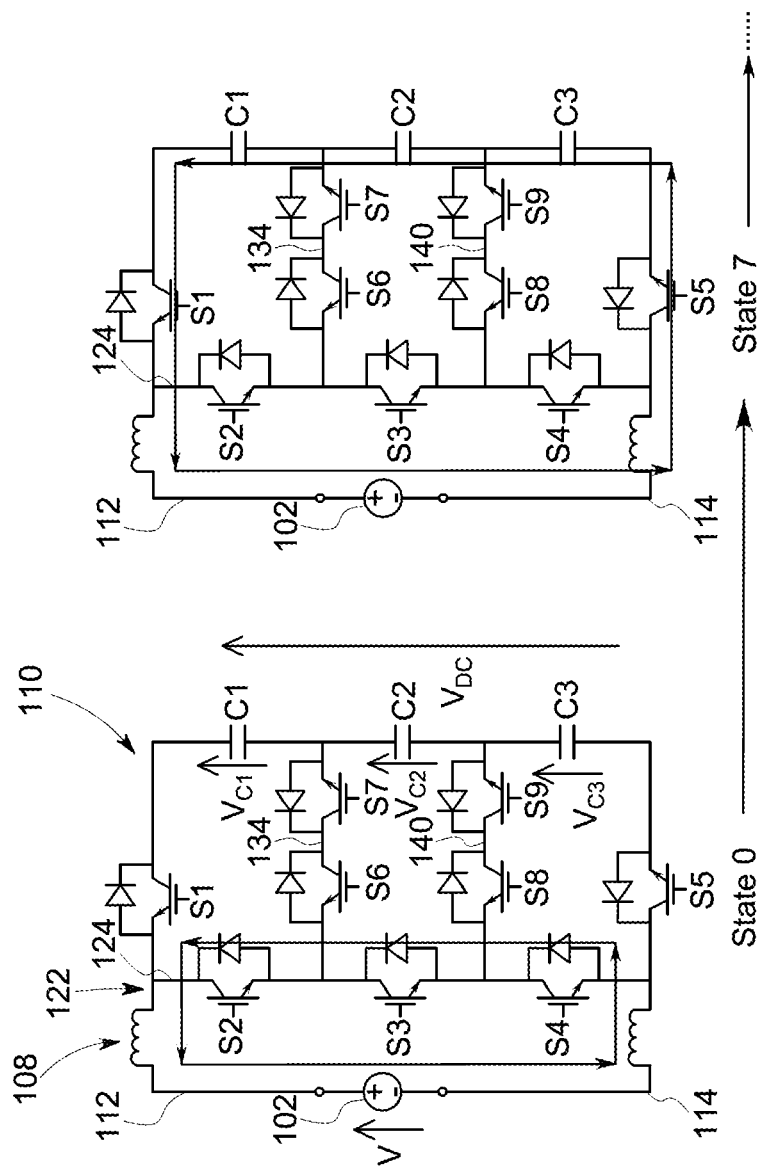
FIG. 18 is circuit diagrams showing switching states of a third switching sequence of the fifth DC/DC power converter of FIG. 10A in a voltage step-down mode.
Figure 19A:
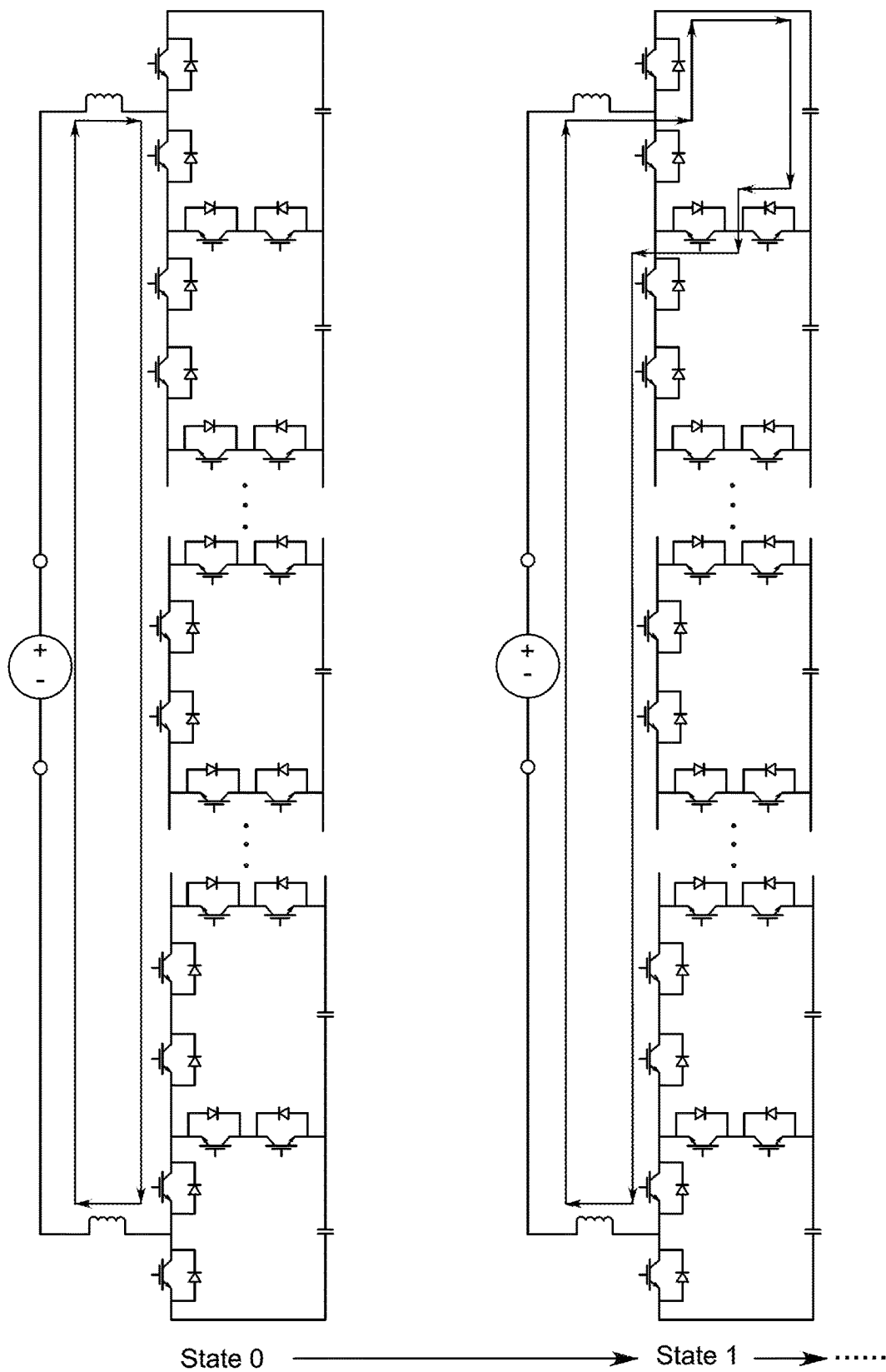
FIGS. 19A to 19D are circuit diagrams showing switching states of a first switching sequence of an eighth DC/DC power converter in a voltage step-up mode.
Figure 19B:
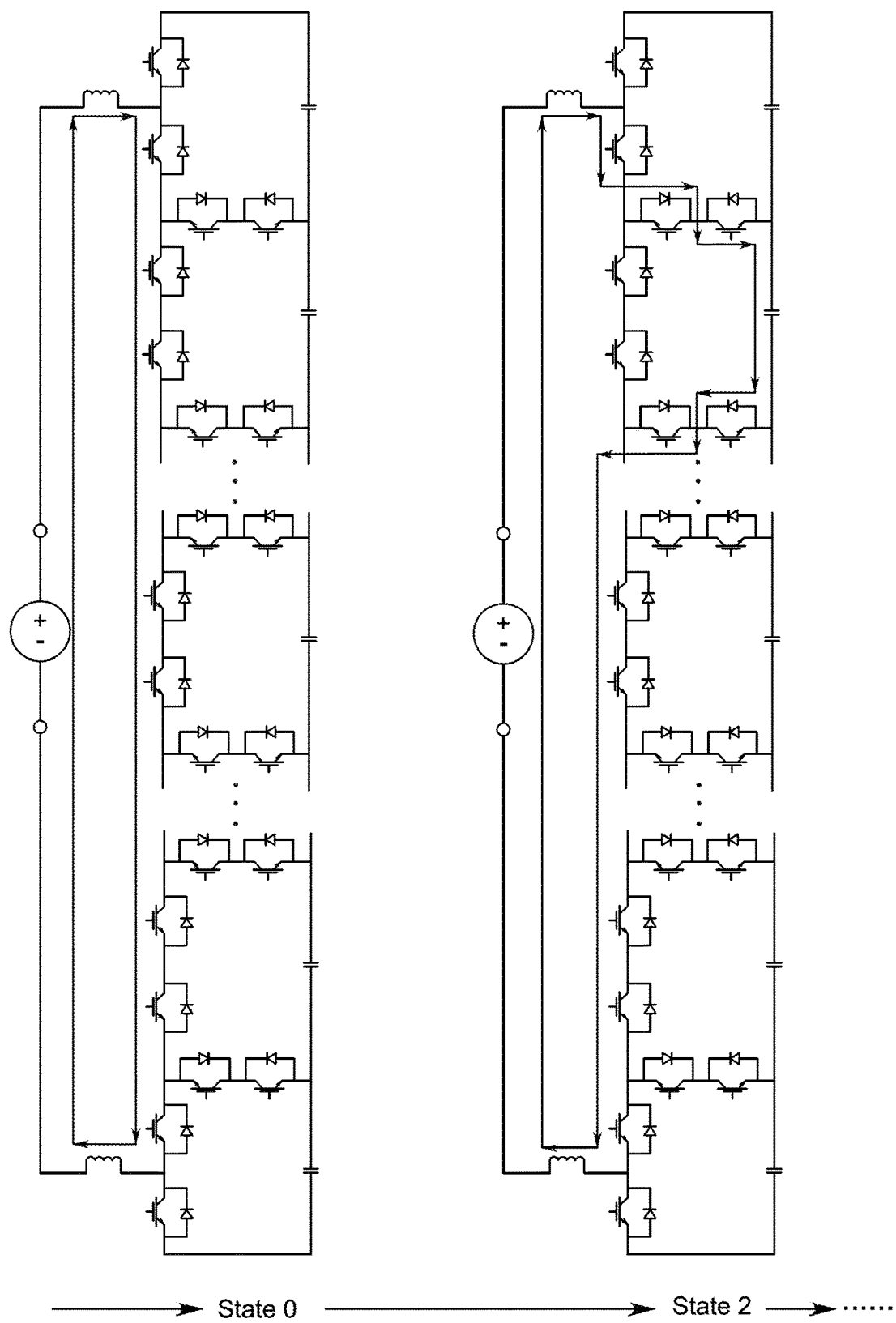
Figure 19C:
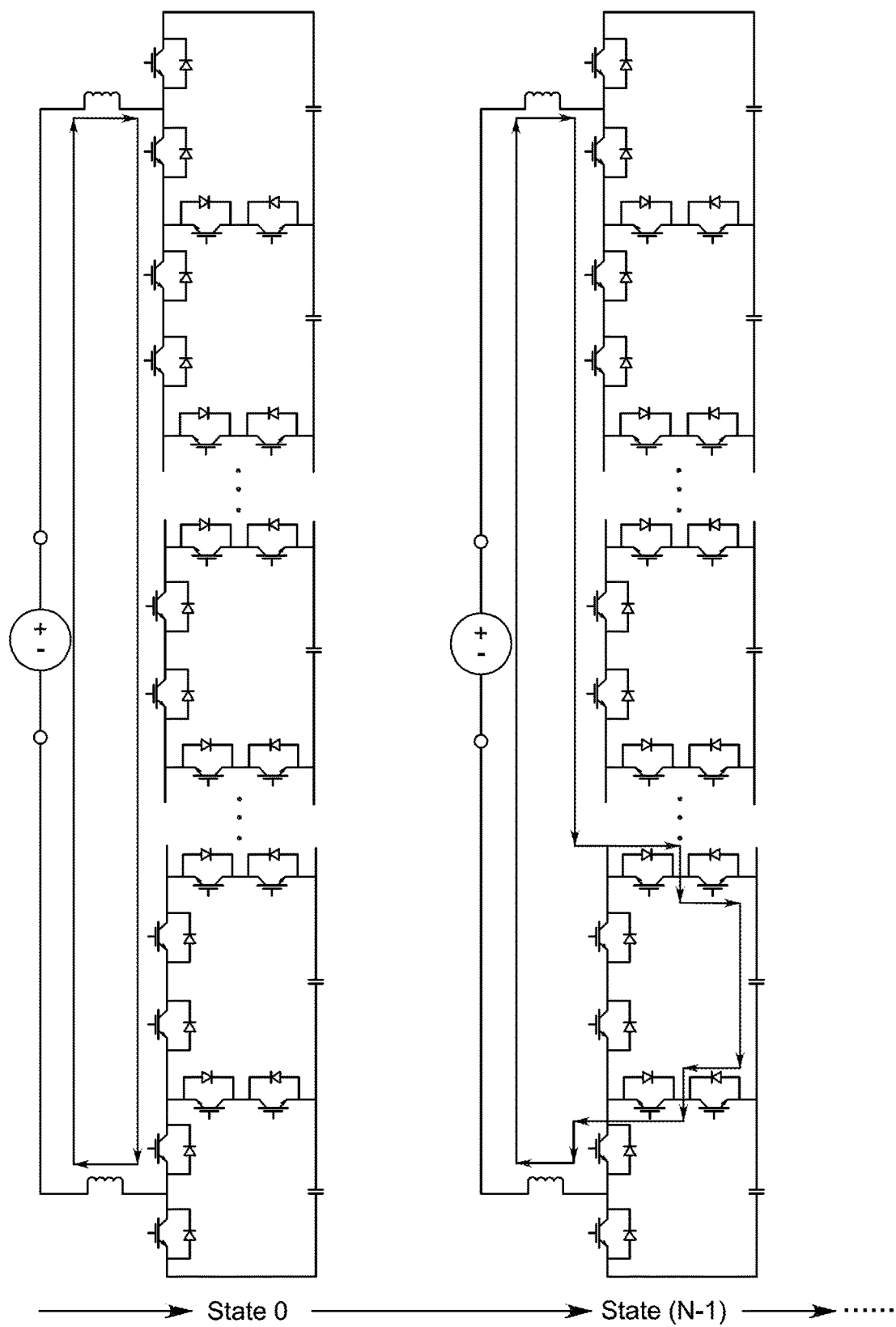
Figure 19D:
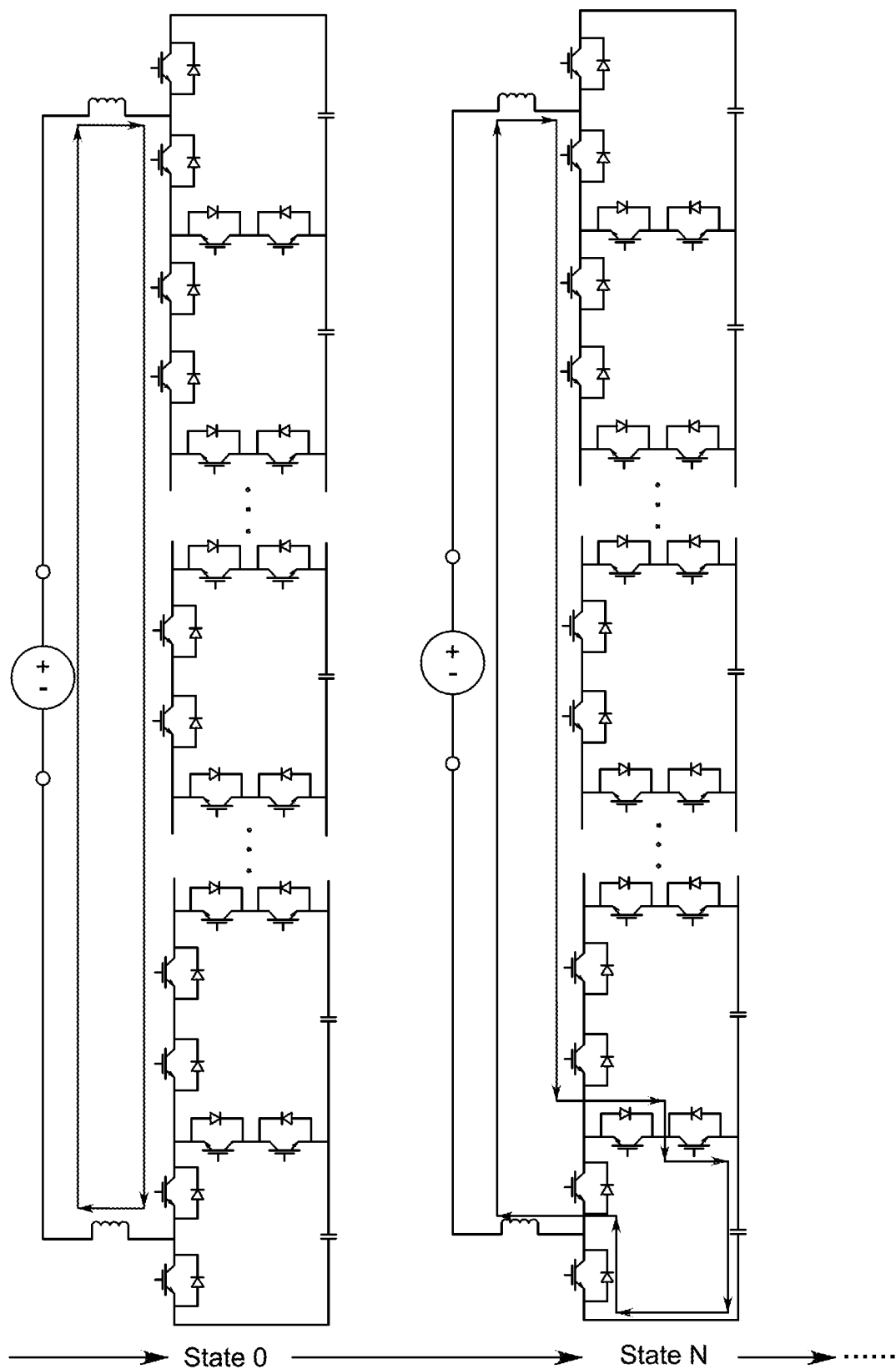

FIG. 18 shows the voltage step-down reactor discharging state and a voltage step-down reactor charging state where the current loop includes all three capacitors C1, C2 and C3 (or all three DC link sections). In particular, the DC/DC power converter 108 can adopt the following states: the voltage step-down reactor discharging state (State 0) described above, and a seventh voltage step-down reactor charging state (State 7).

The first switches S1, S5 and the switches S6, S7, ... S9 in the second and third branches 134, 140 are switched by the controller to switch repeatedly the DC/DC power converter between the voltage step-down reactor discharging state, the seventh voltage step-down reactor charging state, the voltage step-down reactor discharging state, the seventh voltage step-down reactor charging state, and so on (e.g., 0, 7, 0, 7, ... ) as a switching sequence. The current loop for each of the states is shown in FIG. 18 and the particular switching arrangement of the switches S1, S2, ... S9 that the controller uses to derive each state can be summarised in Table 10 where * indicates that the associated freewheeling diode conducts and the controllable semiconductor switch is in the 'off' state:

TABLE 10

|  | S1 | S2 | S3 | S4 | S5 | S6 | S7 | S8 | S9 |
|---|---|---|---|---|---|---|---|---|---|
| State 0 | off | off* | off* | off* | off | off | off | off | off |
| State 7 | on | Off | off | off | on | off | off | off | off |

Corresponding waveforms for this switching sequence are not shown, but can easily be derived by the skilled person.

For the voltage step-down reactor charging states utilised in the switching sequence of FIG. 18, N=3 and K=3. The voltage at the DC power source/load 102 derived during operation of the DC/DC power converter 108 when the switching sequence of FIG. 18 is applied by the controller 146 is given by:

$$V = (V_{DC} \cdot 0.4)$$

Hence, the voltage V is 4400 VDC.

During voltage step-down operation, the controller may switch between the switching sequences shown in FIGS. 15, 17 and 18 as required, e.g., in accordance with the relationship between V and $V_C$.

In the above examples, the DC link voltage is 11 kVDC and the voltage V at the DC power source/load 102 varies. But assuming that the load voltage is maintained substantially constant, if the DC link voltage is greater than or equal to three times the load voltage (i.e., $V_{DC} \geq 3V$) then K=1 and the DC/DC power converter 108 is operated according to a suitable switching sequence, e.g., the switching sequence shown in FIG. 15. If the DC link voltage is less than three times the load voltage but greater than or equal to one and a half times the load voltage (i.e., $3V/2 \leq V_{DC} < 3V$) then K=2 and the DC/DC power converter 108 is operated according to a suitable switching sequence, e.g., the switching sequence shown in FIG. 17. Finally, if the DC link voltage is less than one and a half times the load voltage but greater than or equal to the load voltage (i.e., $V \leq V_{DC} < 3V/2$) then K=3 and the DC/DC power converter 108 is operated according to a suitable switching sequence, e.g., the switching sequence shown in FIG. 18.

The switching sequences highlighted above utilise all of the available DC link sections over the course of switching cycle for K=1, 2 and 3. Other switching sequences that the controller can also use as appropriate include: 0, 1, 0, 2, 0, 1, 0, 2, ... , 0, 2, 0, 3, 0, 2, 0, 3, ... , 0, 1, 0, 3, 0, 1, 0, 3, ... , 0, 1, 0, 1, ... , 0, 2, 0, 2, ... , 0, 3, 0, 3, ... , 0, 4, 0, 5, 0, 4, 0, 5, ... , 0, 5, 0, 6, 0, 5, 0, 6, ... , 0, 4, 0, 6, 0, 4, 0, 6, ... , 0, 4, 0, 4, ... , 0, 5, 0, 5, ... , 0, 6, 0, 6, ... , for example.

Voltage Step-Up Mode, N>3

For completeness, FIGS. 19A to 19D show one voltage step-up reactor charging state and N voltage step-up reactor discharging states where the current loop includes only one of N capacitors (or one of N DC link sections). In particular, the DC/DC power converter can adopt the following states: a voltage step-up reactor charging state (State 0), a first voltage step-up reactor discharging state (State 1), a second voltage step-up reactor discharging state (State 2), a (N−1)th voltage step-up reactor discharging state (State (N−1)), and a Nth voltage step-up reactor discharging state (State N).

It will be readily appreciated that during a voltage step-up mode, the first switches of the first and second sections are maintained in the 'off' state at all times. Only the remaining switches in the first branch (i.e., the second switches in the first and second sections and the switches of the intermediate sections) and the switches in the (N−1) second branches are switched by the controller to switch repeatedly the DC/DC power converter between the voltage step-up reactor charging state, the first voltage step-up reactor discharging state, the voltage step-up reactor charging state, the second voltage step-up reactor discharging state, the voltage step-up up reactor charging state, the third voltage step-up reactor discharging state, the voltage step-up reactor charging state, and so on to Nth voltage step-up reactor discharging state, the voltage step-up reactor charging state, the first voltage step-up reactor discharging start, and so on (e.g., 0, 1, 0, 2, 0, 3, ... (N−1), 0, N, 0, 1, ... ) as a switching sequence.

It will be clear to the skilled person that other voltage step-up reactor discharging states can be derived where the current loop includes two, three, ... N capacitors, and that corresponding voltage step-down reactor discharging and charging states can also be derived for any suitable value of N and used for appropriate switching sequences.

What is claimed is:

1. A DC/DC power converter configured to operate in a voltage step-up mode and a voltage step-down mode, the DC/DC power converter being connectable to a DC power source having first and second DC terminals and comprising:

first and second DC buses respectively connectable to the first and second DC terminals of the DC power source, at least one of the first and second DC buses including a reactor;
third and fourth DC buses defining a DC link;
N energy storage devices connected together in series between the third and fourth DC buses, where N≥2;
a first converter leg comprising:
  a first branch having N sections connected together in series between the third and fourth DC buses in parallel with the N energy storage devices, the N sections including a first section including a first switch connected to the third DC bus and a second switch connected to the first switch by a first connecting node, a second section including a first switch connected to the fourth DC bus and a second switch connected to the first switch by a second connecting node, and one or more intermediate sections between the first and second sections, each intermediate section including at least one switch, wherein the first connecting node is connected to the first DC bus and the second connecting node is connected to the second DC bus; and
  second branches, each second branch being connected between the junction of an adjacent ith pair of the first branch sections and the junction of an adjacent ith pair of energy storage devices, where $1 \leq i \leq (N-1)$, each second branch including a first switch and a second switch;
  wherein each switch comprises at least one controllable semiconductor switch and an anti-parallel connected freewheeling diode, each switch having an 'on' state when the at least one controllable semiconductor switch is in a conducting state and an 'off' state when the at least one controllable semiconductor switch is in a non-conducting state; and
a controller for selectively switching the controllable semiconductor switches between the conducting state and the non-conducting state;
wherein in the voltage step-up mode the controller is configured to switch repeatedly the DC/DC power converter between the following states to supply power from the DC power source to the DC link:
  a voltage step-up reactor charging state to charge the reactor from the DC power source where the first switches in the first and second sections of the first branch and the first and second switches in each second branch are switched to the 'off' state and the remaining switches in the first branch are switched to the 'on' state such that current circulates in a first direction around a current loop that includes the DC power source, the at least one reactor, and the remaining switches in the first branch; and
  one of a plurality of voltage step-up reactor discharging states to discharge the reactor to the DC link, where the switches in the first branch and the first and second switches in each second branch are switched to the 'on' or 'off' state such that current circulates in a first direction around a current loop that includes the DC power source, the at least one reactor, and one or more of the energy storage devices; and
wherein in the voltage step-down mode the controller is configured to switch repeatedly the DC/DC power converter between the following states to supply power from the DC link to the DC power source:
  one of a plurality of voltage step-down reactor charging states to charge the reactor from the DC link, where the switches in the first branch and the first and second switches in each second branch are switched to the 'on' or 'off' state such that current circulates in a second direction around a current loop that includes the DC power source, the at least one reactor, and one or more of the energy storage devices; and
  a voltage step-down reactor discharging state to discharge the reactor to the DC power source where the first switches in the first and second sections of the first branch and the first and second switches in each second branch are switched to the 'off' state and the remaining switches in the first branch are switched to the 'off' state such that current circulates in a second direction around a current loop that includes the DC power source, the at least one reactor, and the remaining switches in the first branch.

2. A DC/DC power converter according to claim 1, operated according to a switching sequence that represents the successive states adopted by the DC/DC power converter.

3. A DC/DC power converter according to claim 2, wherein a switching sequence for voltage step-up operation includes the voltage step-up reactor charging state and one or more voltage step-down reactor discharging states where the current loop includes the same number of energy storage devices, and/or wherein a switching sequence for voltage step-down operation includes the voltage step-down reactor discharging state and one or more voltage step-down reactor charging states where the current loop includes the same number of energy storage devices.

4. A DC/DC power converter according to claim 3, wherein the controller is adapted to switch the DC/DC power converter between different switching sequences.

5. A DC/DC power converter according to claim 4, wherein the controller is adapted to switch the DC/DC power converter between different switching sequences based on a relationship between the voltage at the DC power source and the voltage across at least one of the energy storage devices.

6. A DC/DC power converter according to claim 1, wherein the voltages across the energy storage devices are controlled to be substantially identical.

7. A DC/DC power converter according to claim 1, wherein the voltages across the energy storage devices are controlled independently.

8. A DC/DC power converter according to claim 1, wherein the DC link includes up to (N−1) additional DC buses where each ith additional DC bus is connected to the junction of an adjacent ith pair of energy storage devices.

9. A DC/DC power converter according to claim 1, wherein a reactor is provided in both the first and second DC buses.

10. A DC/DC power converter according to claim 1, including Q converter legs, where Q≥2, connected in parallel between the third and fourth DC buses.

11. A DC/DC power converter according to claim 1, wherein the converter legs are operated with a phase shift.

12. An arrangement wherein two or more DC/DC power converters according to claim 1 are connected to one of a DC power source and a DC load.

13. An arrangement according to claim 12, wherein each DC/DC power converter defines a converter module and wherein the converter modules are inter-connected in series and/or parallel.

14. A DC/DC power converter configured to operate in a voltage step-up mode, the DC/DC power converter being connectable to a DC power source having first and second DC terminals and comprising:
  first and second DC buses respectively connectable to the first and second DC terminals of the DC power source, at least one of the first and second DC buses including a reactor;
  third and fourth DC buses defining a DC link;
  N energy storage devices connected together in series between the third and fourth DC buses, where N≥2;
  a first converter leg comprising:
    a first branch having N sections connected together in series between the third and fourth DC buses in parallel with the N energy storage devices, the N sections including a first section including one of a first switch and a diode connected to the third DC bus and a second switch connected to the one of the first switch and the diode by a first connecting node, a second section including one of a first switch and a diode connected to the fourth DC bus and a second switch connected to the one of the first switch and the diode by a second connecting node, and one or more intermediate sections between the first and second sections, each intermediate section including at least one switch, wherein the first connecting node is connected to the first DC bus and the second connecting node is connected to the second DC bus; and
    second branches, each second branch being connected between the junction of an adjacent ith pair of the first branch sections and the junction of an adjacent ith pair of energy storage devices, where 1≤i≤(N−1), each second branch including a first switch and a second switch;
  wherein each switch comprises at least one controllable semiconductor switch and an anti-parallel connected freewheeling diode, each switch having an 'on' state when the at least one controllable semiconductor switch is in a conducting state and an 'off' state when the at least one controllable semiconductor switch is in a non-conducting state; and
  a controller for selectively switching the controllable semiconductor switches between the conducting state and the non-conducting state;
  wherein the controller is configured to switch repeatedly the DC/DC power converter between the following states to supply power from the DC power source to the DC link:
    a voltage step-up reactor charging state to charge the reactor from the DC power source where the first switches in the first and second sections of the first branch and the first and second switches in each second branch are switched to the 'off' state and the remaining switches in the first branch are switched to the 'on' state such that current circulates around a current loop that includes the DC power source, the at least one reactor, and the remaining switches in the first branch; and
    one of a plurality of voltage step-up reactor discharging states to discharge the reactor to the DC link, where the switches in the first branch and the first and second switches in each second branch are switched to the 'on' or 'off' state such that current circulates around a current loop that includes the DC power source, the at least one reactor, and one or more of the energy storage devices.

15. A DC/DC power converter according to claim 14, operated according to a switching sequence that represents the successive states adopted by the DC/DC power converter.

16. A DC/DC power converter according to claim 14, wherein the voltages across the energy storage devices are controlled to be substantially identical.

17. A DC/DC power converter configured to operate in a voltage step-down mode, the DC/DC power converter being connectable to a DC load having first and second DC terminals and comprising:
  first and second DC buses respectively connectable to the first and second DC terminals of the DC load, at least one of the first and second DC buses including a reactor;
  third and fourth DC buses defining a DC link;
  N energy storage devices connected together in series between the third and fourth DC buses, where N≥2;
  a first converter leg comprising:
    a first branch having N sections connected together in series between the third and fourth DC buses in parallel with the N energy storage devices, the N sections including a first section including a first switch connected to the third DC bus and one of a second switch and a diode connected to the first switch by a first connecting node, a second section including a first switch connected to the fourth DC bus and one of a second switch and a diode connected to the first switch (by a second connecting node, and one or more intermediate sections between the first and second sections, each intermediate section including at least one switch or diode, wherein the first connecting node is connected to the first DC bus and the second connecting node is connected to the second DC bus; and
    second branches, each second branch being connected between the junction of an adjacent ith pair of the first branch sections and the junction of an adjacent ith pair of energy storage devices, where 1≤i≤(N−1), each second branch including a first switch and a second switch;
  wherein each switch comprises at least one controllable semiconductor switch and an anti-parallel connected freewheeling diode, each switch having an 'on' state when the at least one controllable semiconductor switch is in a conducting state and an 'off' state when the at least one controllable semiconductor switch is in a non-conducting state; and
  a controller for selectively switching the controllable semiconductor switches between the conducting state and the non-conducting state;
  wherein the controller is configured to switch repeatedly the DC/DC power converter between the following states to supply power from the DC link to the DC load:
    one of a plurality of voltage step-down reactor charging states to charge the reactor from the DC link, where the switches in the first branch and the first and second switches in each second branch are switched to the 'on' or 'off' state such that current circulates around a current loop that includes the DC load, the at least one reactor, and one or more of the energy storage devices; and
    a voltage step-down reactor discharging state to discharge the reactor to the DC load where the first switches in the first and second sections of the first branch and the first and second switches in each second branch are switched to the 'off' state and the remaining switches in the first branch are switched to the 'off' state or the diodes in the first branch conduct such that current circulates around a current loop that includes the DC load, the at least one reactor, and the remaining switches in the first branch or the diodes in the first branch.

18. A DC/DC power converter according to claim 17, wherein the DC link includes up to (N−1) additional DC buses where each ith additional DC bus is connected to the junction of an adjacent ith pair of energy storage devices.

19. A DC/DC power converter according to claim 17, wherein a reactor is provided in both the first and second DC buses.

20. A DC/DC power converter according to claim 17, including Q converter legs, where Q≥2, connected in parallel between the third and fourth DC buses.

* * * * *